US010761916B2

(12) United States Patent
Mariani

(10) Patent No.: US 10,761,916 B2
(45) Date of Patent: Sep. 1, 2020

(54) METHOD FOR EXECUTING PROGRAMS IN AN ELECTRONIC SYSTEM FOR APPLICATIONS WITH FUNCTIONAL SAFETY COMPRISING A PLURALITY OF PROCESSORS, CORRESPONDING SYSTEM AND COMPUTER PROGRAM PRODUCT

(71) Applicant: Intel Corporation, Santa Clara, CA (US)

(72) Inventor: Riccardo Mariani, Pisa (IT)

(73) Assignee: Intel Corporation, Santa Clara, CA (US)

(*) Notice: Subject to any disclaimer, the term of this patent is extended or adjusted under 35 U.S.C. 154(b) by 225 days.

(21) Appl. No.: 15/759,793

(22) PCT Filed: Oct. 12, 2016

(86) PCT No.: PCT/IB2016/056089
§ 371 (c)(1),
(2) Date: Mar. 13, 2018

(87) PCT Pub. No.: WO2017/064623
PCT Pub. Date: Apr. 20, 2017

(65) Prior Publication Data
US 2018/0349259 A1 Dec. 6, 2018

(30) Foreign Application Priority Data
Oct. 13, 2015 (IT) .................. 102015000061102

(51) Int. Cl.
*G06F 11/00* (2006.01)
(52) U.S. Cl.
CPC .................. *G06F 11/008* (2013.01)
(58) Field of Classification Search
CPC ................. G06F 11/008; G06F 11/3684–3692
(Continued)

(56) References Cited

U.S. PATENT DOCUMENTS 8,621,273 B2* 12/2013 Zalman .................. G06F 11/10
714/10
10,248,492 B2* 4/2019 Mariani ................ G06F 11/079
(Continued)

FOREIGN PATENT DOCUMENTS

JP 2004038654 A 2/2004

OTHER PUBLICATIONS

International Search Report and Written Opinion dated Jan. 23, 2017 for International Application No. PCT/IB2016/056089, 8 pages.

*Primary Examiner* — Joseph R Kudirka
(74) *Attorney, Agent, or Firm* — Schwabe, Williamson & Wyatt, P.C.

(57) ABSTRACT

A method for executing programs (P) in an electronic system for applications with functional safety that comprises a single-processor or multiprocessor processing system (10) and a further independent control module (15), including: carrying out a decomposition of a program (P) that includes a safety function (SF) to be executed via said system (10) into a plurality of parallel subprograms (P1, . . . , Pn); assigning execution of each parallel subprogram (P1, . . . , Pn) to a respective processing module (11) of the system, in particular a processor (C1, . . . , Cm) of said multiprocessor architecture (10) or a virtual machine (V1, . . . , Vn) associated to one of said processors (C1, . . . , Cm); carrying out in the system (10), periodically according to a cycle frequency ($f_{cyc}$) of the program (P) during normal operation of said system (10), in the context of said safety function (SF), self-test operations ($A_{stl}$, $A_{sys}$, $A_{chk}$) associated to each of said subprograms (P1, . . . , Pn) and to the corresponding processing modules (11) on which they are executed, said self-test operations ($A_{stl}$, $A_{sys}$, $A_{chk}$) including: diagnostic-self-test operations ($A_{stl}$), which carry out diagnostic self-tests; operations ($A_{sys}$) of self-testing of system values
(Continued)

measured on the architecture (10); applicational self-test operations ($A_{chk}$), which include operations of checking execution of conditions of use ($A_{cou}$) and/or execution of LBISTs (Logic Built-in Self-Tests) ($A_{bst}$), and including: generating respective self-test data ($D_{stl}$, $D_{sys}$, $D_{chk}$) corresponding to the self-test operations ($A_{stl}$, $A_{sys}$, $A_{chk}$) and carrying out checking operations (51, 61) on said self-test data ($D_{stl}$, $D_{sys}$, $D_{chk}$); exchanging said self-test data ($D_{stl}$, $D_{sys}$, $D_{chk}$) continuously via a protocol (PL) of messages (MC) with the further independent control module (15); carrying out at least part of said checking operations (51, 61) in said further control module (15); and executing said operation of decomposition of the program (P) into a plurality of parallel subprograms (P1, . . . , Pn) to achieve a coverage target ($A_{stl}$, $A_{sys}$, $A_{chk}$) for each of said self-test operations ($A_{stl}$, $A_{sys}$, $A_{chk}$) associated to a respective subprogram (P1, . . . , Pn) or processing module (11) in such a way that it respects a given failure-probability target (g12).

16 Claims, 15 Drawing Sheets

(58) Field of Classification Search
USPC .................................................. 714/10, 38.1
See application file for complete search history.

(56) References Cited

U.S. PATENT DOCUMENTS

| | | |
|---|---|---|
| 2008/0141065 A1 | 6/2008 | Tatsuya |
| 2012/0005534 A1 | 1/2012 | Fula et al. |

* cited by examiner

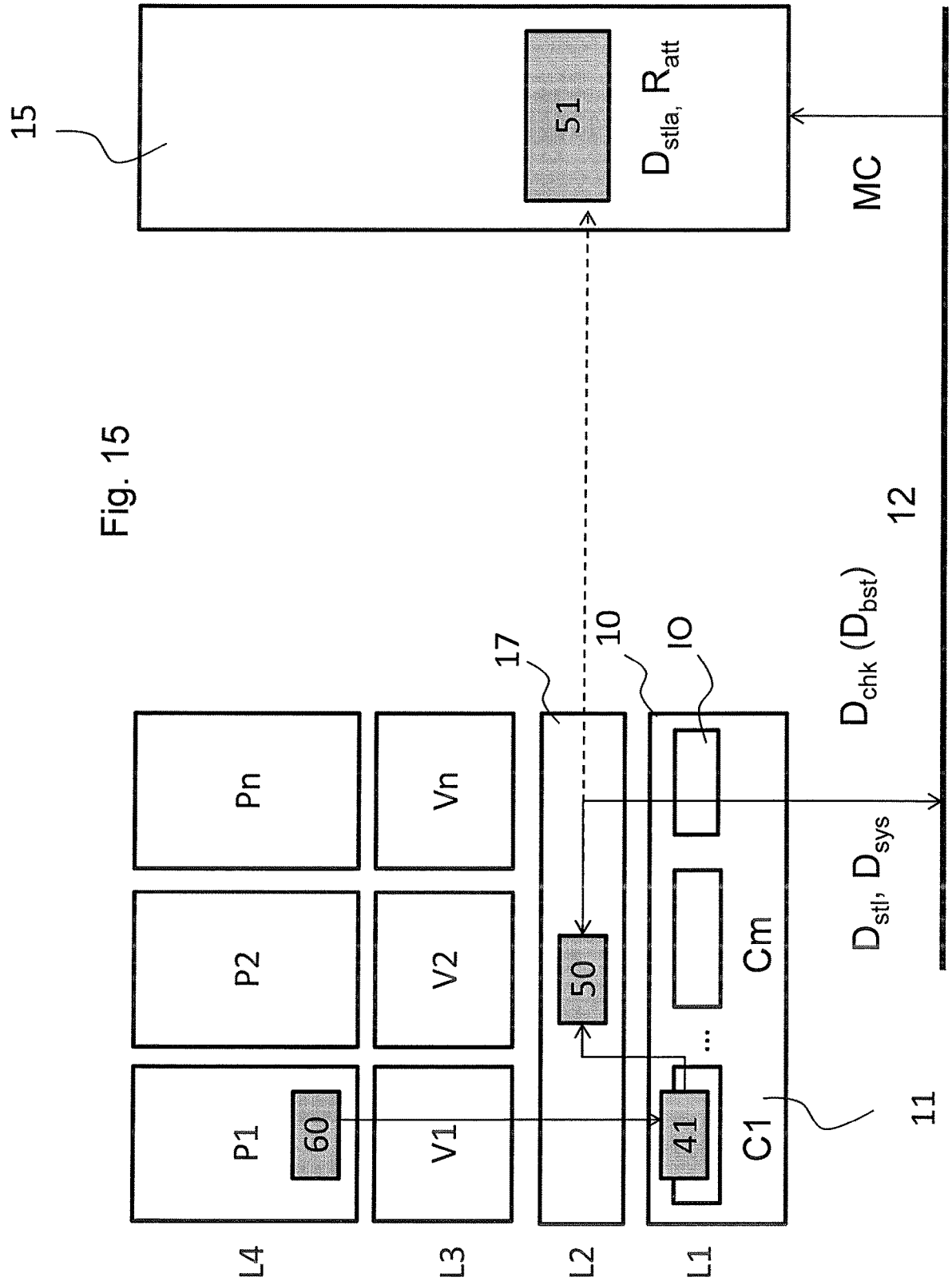

METHOD FOR EXECUTING PROGRAMS IN AN ELECTRONIC SYSTEM FOR APPLICATIONS WITH FUNCTIONAL SAFETY COMPRISING A PLURALITY OF PROCESSORS, CORRESPONDING SYSTEM AND COMPUTER PROGRAM PRODUCT

CROSS REFERENCE TO RELATED APPLICATIONS

The present application is a national phase entry under 35 U.S.C. § 371 of International Application No. PCT/IB2016/056089, filed Oct. 12, 2016, entitled "METHOD FOR EXECUTING PROGRAMS IN AN ELECTRONIC SYSTEM FOR APPLICATIONS WITH FUNCTIONAL SAFETY COMPRISING A PLURALITY OF PROCESSORS, CORRESPONDING SYSTEM AND COMPUTER PROGRAM PRODUCT", which claims priority to Italian Patent Application No. 102015000061102, filed Oct. 13, 2015, entitled "METHOD FOR EXECUTING PROGRAMS IN AN ELECTRONIC SYSTEM FOR APPLICATIONS WITH FUNCTIONAL SAFETY COMPRISING A PLURALITY OF PROCESSORS, CORRESPONDING SYSTEM AND COMPUTER PROGRAM PRODUCT". The PCT/IB2016/056089 application designated, among the various States, the United States of America. The Specifications of the PCT/IB2016/056089 and Italian Patent Application No. 102015000061102 are hereby incorporated by reference.

TECHNICAL FIELD

The present description relates to techniques for executing programs in the context of electronic systems for applications in which functional safety is required. The electronic system described is based upon an architecture comprising a single processor (CPU) or a plurality of processors. The techniques described provide:

carrying out a decomposition of the program to be executed via said architecture into a plurality of parallel subprograms;

assigning execution of each parallel subprogram to a respective processing module of the system, in particular a physical processor or a virtual machine associated to one of said processors; and executing, periodically according to a cycle frequency of the program during normal operation of said architecture, self-test operations designed to meet the functional-safety targets.

Various embodiments may be applied to functional safety. In particular, various embodiments find application in electronic systems in the field of industrial robotics and industrial controls, and in the technical field of electronic systems for automotive applications of assistance to the driver and partially or completely automatic driving.

Technological Background

Functional-safety standards, such as IEC 61508, ISO 13849, and ISO 26262 contain requirements for detection of potentially dangerous failures in integrated electronic systems. For instance, in the standard ISO 26262, one of the requirements is defined as "probabilistic metric for HW random failures (PMHF)", which to a first approximation is defined, for a given failure model F, as the product between the basic failure probability ($\lambda$), the distribution of this probability on the failure model ($\Lambda F$), the one's complement of the safe-failure fraction (1−s), and the one's complement of the diagnostic coverage of non-safe failures (1−k).

By "safe failures" are meant failures that are such that the mission of the program executed by the electronic device will not be affected or else will be affected in a safe way; i.e., the mission terminates with a known state, the so-called "safe state", where there is no danger for functional safety.

Processors of a single-processor or multiprocessor processing system are among the most critical elements of such integrated electronic systems, and their complexity increases with the advances made in the art.

In regard to the processors, the aforesaid standards (for example, ISO 26262-5, Annex D, Table D.4) present various possible techniques for obtaining diagnostic values of coverage of non-safe failures, designated by k, that are as high as possible.

The above techniques have found various implementations in the prior art.

Architectures, such as the ones described in the U.S. Pat. No. 6,233,702 or in the U.S. Pat. No. 7,472,051, necessarily require a modification of the hardware of the processor in order to guarantee functional safety so as to implement a complete or reduced form of redundancy of the processor.

Architectures, such as the ones described in the U.S. Pat. No. 5,513,319, envisage that an independent element (watchdog) is queried periodically by the processor at preset time intervals. However, the functional safety that it can guarantee is limited in so far as only a small percentage of the failures of the processor can be detected with such a method—basically the ones that cause a substantial difference in the program flow.

OBJECT AND SUMMARY

The embodiments described herein have the purpose of improving the potential of the methods according to the prior art as discussed previously, in particular making it possible to achieve a high diagnostic coverage on complex architectures, such as those of modern multiprocessors, likewise limiting the coverage target for the single processor and limiting or removing the need for modifications to the hardware.

Various embodiments achieve the above purpose thanks to a method having the characteristics recalled in the ensuing claims. Various embodiments may refer also to an architecture, as they may likewise refer to a computer program product that can be loaded into the memory of at least one computer (e.g., a terminal in a network) and comprises portions of software code designed to implement the steps of the method when the program is run on at least one computer. As used herein, the above computer program product is understood as being equivalent to a computer-readable means containing instructions for controlling the computer system so as to co-ordinate execution of the method according to the invention. Reference to "at least one computer" is understood as emphasizing the possibility of the present invention to be implemented in a modular and/or distributed form. The claims form an integral part of the technical teachings provided herein in relation to the invention.

Various embodiments may provide that the method includes self-test operations that comprise:

diagnostic-self-test operations, i.e., operations that carry out tests on the processor and compare the result with values pre-calculated in the design stage;

operations of self-testing of system values measured on the architecture (purely by way of example, the voltage and temperature) and comparison of the result with expected reference ranges;

applicational self-test operations, which comprise self-test operations that include periodic execution in the plurality of parallel programs of so-called "conditions of use" (i.e., dedicated operations, for example, of flow control and/or of encapsulation of data with protective codes and/or repetition of specific portions of subprograms) and/or periodic execution of LBIST (Logic Built-in Self-Test) circuitries, and that comprise:

generating respective self-test data corresponding to the self-test operations and carrying out checking operations on said self-test data;

exchanging said self-test data continuously via a protocol of messages with a further independent control module;

carrying out at least part of said checking operations in said further independent control module; and executing said operation of decomposition of the program into a plurality of parallel subprograms so as to respect a failure-probability target that is a function of a coverage value determined by said diagnostic-self-test operations, of a coverage value determined by the operations of self-testing of system values measured on the architecture, and of a coverage value determined by the applicational self-test operations.

The described procedure of decomposition of the programs and the partitioning of the self-test operations into the aforesaid three separate operations (diagnostic self-testing, self-testing via monitoring of the system values, and applicational self-testing) enables improvement over the prior art; namely:

tripartitioning enables distribution of the targets in an optimised way, i.e., by lowering the target for the operations that—for the particular type of system to which the method described is applied—would require for their achievement a major design effort or modifications of the hardware and instead raising it for those operations that prove lighter in this framework;

the possibility of carrying out self-testing of the programs in the target time with execution of conditions of use and/or of LBISTs enables, in the case of systems in which the computational resources are already used to a large extent, to achieve the same coverage result, without further penalizing the computational performance of the system.

BRIEF DESCRIPTION OF THE DRAWINGS

Various embodiments will now be described, purely by way of example, with reference to the annexed drawings, in which:

FIG. 15 shows a further variant embodiment of the scheme of software layers of the multiprocessor architecture configured for implementing the method described herein.

DETAILED DESCRIPTION

In the ensuing description, numerous specific details are provided in order to enable maximum understanding of the embodiments that are provided by way of example. The embodiments may be implemented with or without specific details, or else with other methods, components, materials, etc. In other circumstances, well-known structures, materials, or operations are not illustrated or described in detail so that various aspects of the embodiments will not be obscured. Reference in the course of the present description to "an embodiment" or "one embodiment" means that a particular structure, peculiarity, or characteristic described in connection with its implementation is comprised in at least one embodiment. Hence, phrases such as "in an embodiment" or "in one embodiment" that may recur in various points of the present description do not necessarily refer to one and the same embodiment. Furthermore, the particular structures, peculiarities, or characteristics may be combined in any convenient way in one or more embodiments.

The various references are provided herein merely for convenience of the reader and do not define the scope or meaning of the embodiments.

Figure 1:
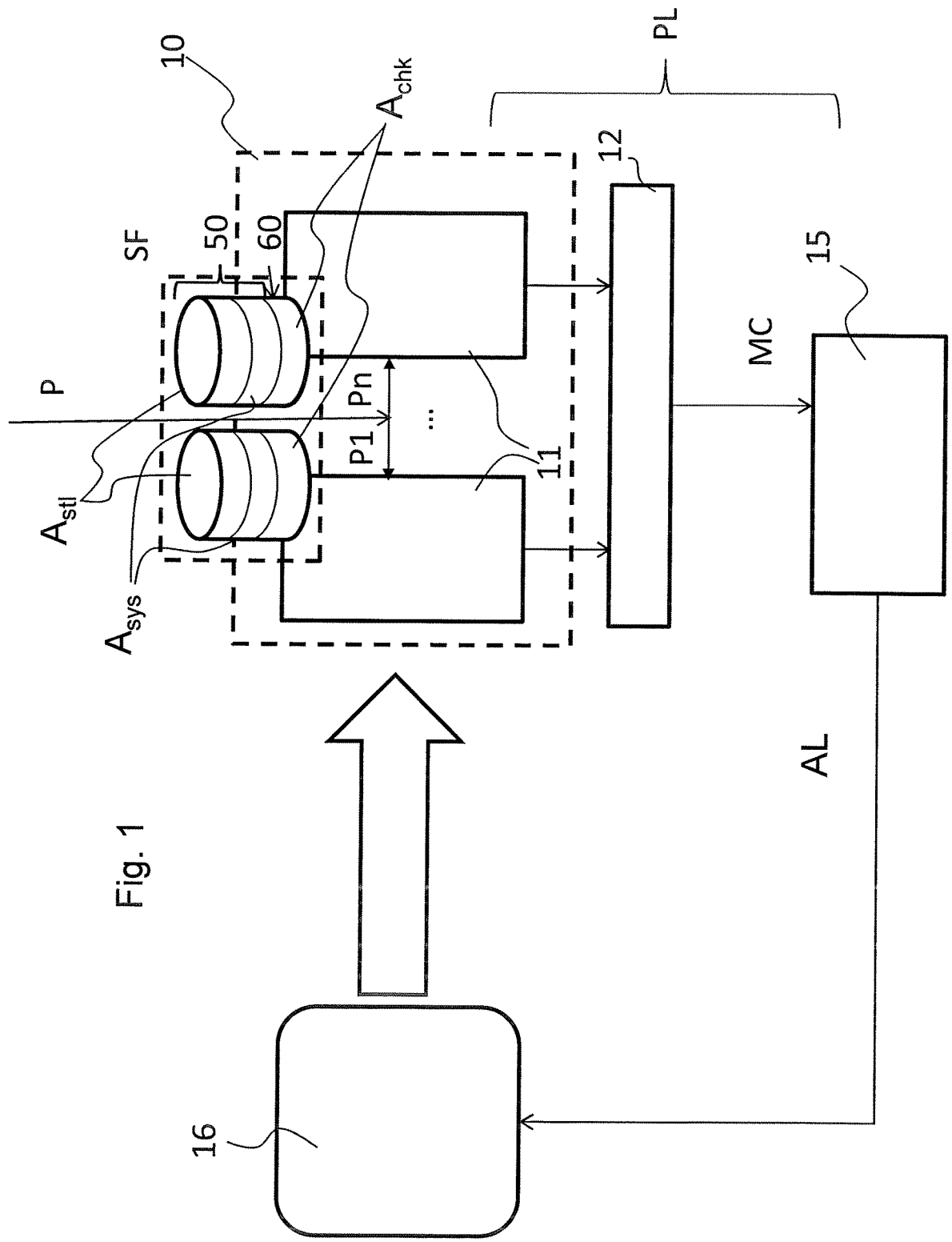
FIG. 1 shows a block diagram of an embodiment of a multiprocessor architecture of an electronic system configured for implementing the method described herein.

FIG. 1 illustrates a processing architecture provided with functional safety of an integrated electronic system for functional-safety applications. As has been said, the electronic system may, for example, be an electronic system for automotive applications of assistance to the driver and for partially or completely automatic driving, which comprises a processing architecture that operates in functional safety.

The above architecture comprises a multiprocessor processing system; namely, implemented on the multiprocessor processing system, designated as a whole by the reference number 10, is a functional-safety system based upon provision of a number of processing and control channels. By "channel", in the context of safety and in particular of IEC 61508, is meant an element or set of elements that independently implements/implement a so-called "safety function"

SF" (see IEC 61508-4, 3.3.6). This may, for example, be a microprocessor, a virtual machine, or else some other element.

Figure 3:
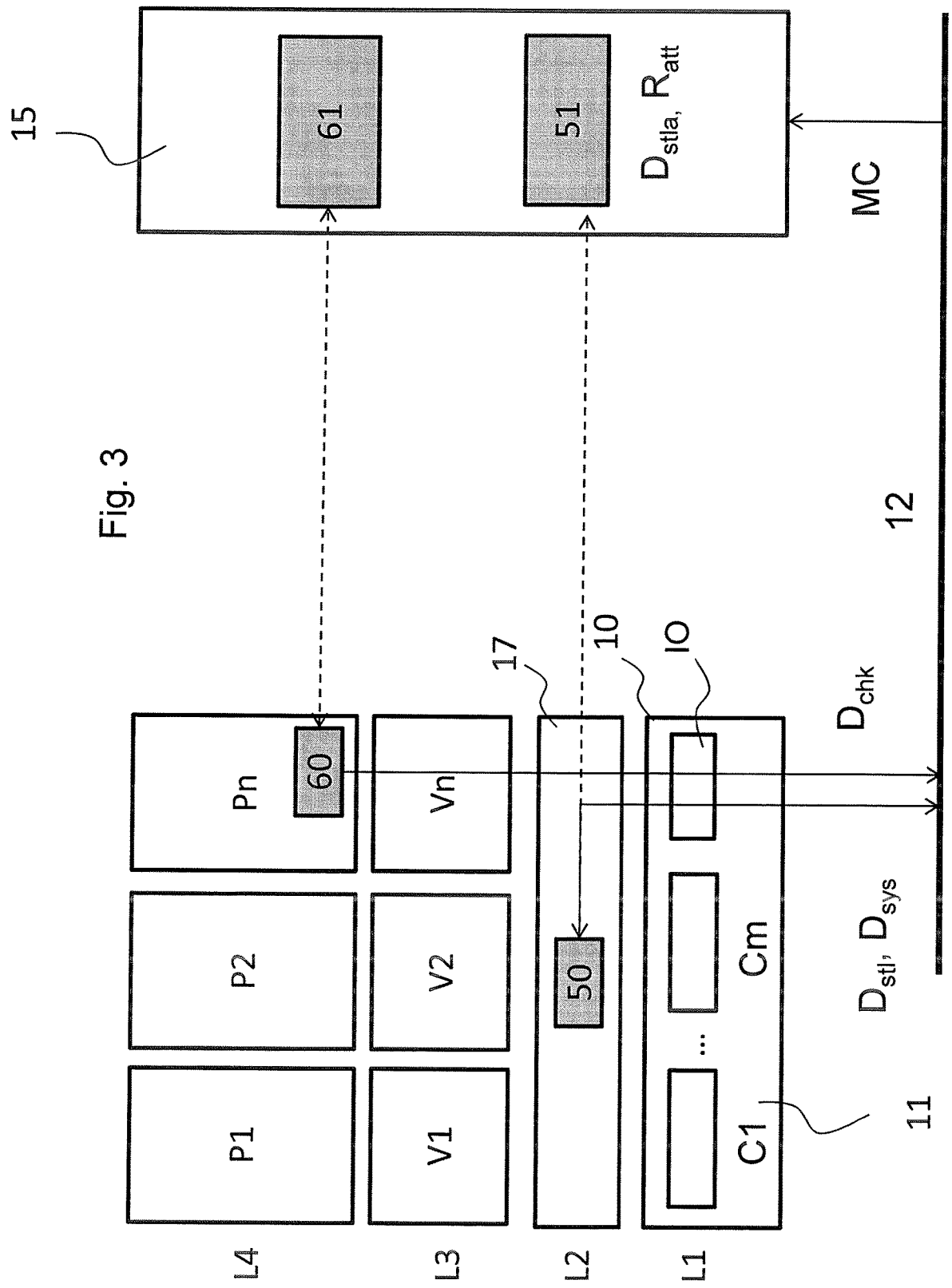
FIG. 3 shows a diagram of software layers of the multiprocessor architecture configured for implementing the method described herein.

The multiprocessor processing system 10 comprises a plurality of processor modules 11. The aforesaid processor modules 11 mainly comprise independent CPUs (Central Processing Units), that is, so-called "cores". As described in detail in what follows, a processor module in a multi-core system (as also in a single-core system) may refer, in the present description, also to a virtual machine generated by virtualization software on one of the aforesaid cores. With reference to FIGS. 1 and 3, by "processor module" 11 is hence meant herein one of a plurality of cores C1, . . . , Cm of the multiprocessor 10 or else even one of a plurality of virtual machines V1, . . . , Vn implemented on one or more of the above cores C1, . . . , Cm.

The multiprocessor 10 may be architecturally built in different ways, which comprise both homogeneous architectures (i.e., ones in which the various processing cores 11 are the same) and heterogeneous architectures (i.e., ones in which the processing cores 11 are different), as well as shared-memory architectures or distributed-memory architectures that communicate by exchange of messages. From the standpoint of physical implementation, multiple solutions are possible, which range from a higher degree of integration, where the cores 11 are provided in the one and the same integrated circuit, to a lower degree of integration, where the cores 11 of the multiprocessor 10 are provided on different integrated circuits or on different and separate modules.

In this context, represented in the example of FIG. 1 is an architecture that comprises just one of the aforesaid multiprocessors 10, which in turn comprises the plurality of processor modules 11. Executed on the aforesaid multiprocessor 10 are the application functions, i.e., the programs P, for example for control or assistance to driving of a motor vehicle, and the safety functions SF aimed at self-testing of the integrity of the system and at detection of possible failures or malfunctioning that may arise in the logic and in the solid-state memories of the multiprocessors 10 themselves or in subparts thereof.

In addition to the multiprocessor 10, the architecture provided with functional safety represented in FIG. 1 provides an independent processing unit represented by the control module 15, which is configured for analysing, processing, and comparing the content of flows of monitoring and control messages MC coming from the various programs operating in the multiprocessor 10 that implement the aforesaid self-test operations, which are carried out by the processors 11 of the multiprocessor 10 in order to enable monitoring of their functional safety and detection of any possible malfunctioning that may arise in the logic that makes them up, or else more in general in the flow of execution of subprograms P1, . . . , Pn, into which the program P is broken down so that it can be executed on the respective processor modules 11.

The multiprocessor 10 and the control module 15 communicate through communication means 12, which enable the various processor modules 11 of the multiprocessor 10 to send and receive the aforesaid monitoring and control messages MC to and from the processing and comparison unit, i.e., the control module 15, which can, in turn, respectively receive and send messages, for example alarms, from and to the multiprocessor 10.

As has been said, represented for simplicity in FIG. 1 is just one multiprocessor 10, but in actual fact the architecture may provide a number of processors or multiprocessors that exchange the monitoring and control messages with the control module 15 through respective communication means 12.

Figure 2:
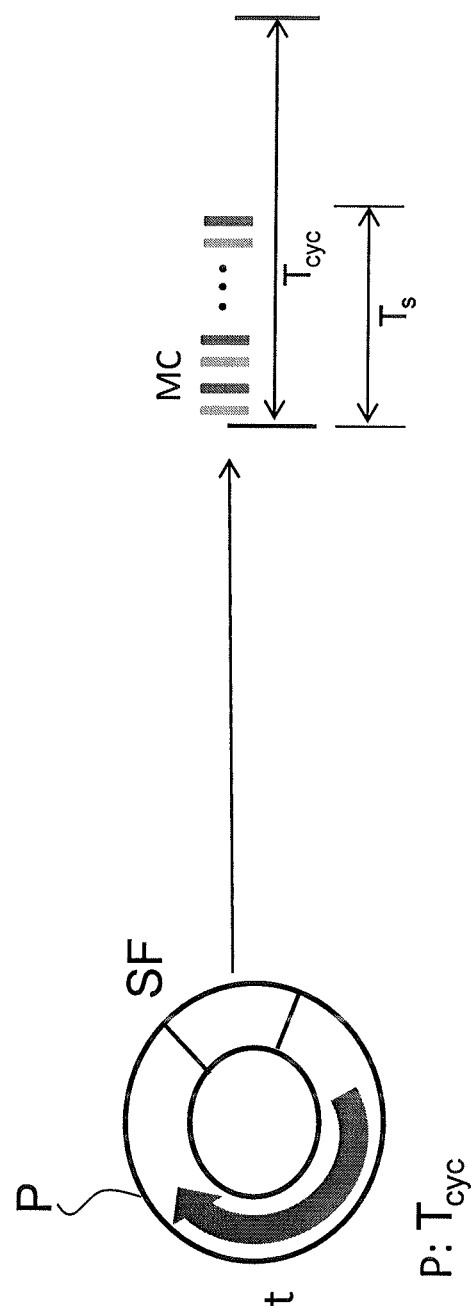
FIG. 2 shows a diagram representing a safety function used by the method described herein.

The method described herein applies to all these possible configurations of a multiprocessor 10 on which a safety function, designated by SF in FIG. 2, is implemented. By "safety function" is meant a function that operates in the framework of a system for which respect of the requirements of functional safety referred to in the aforementioned standards is required. FIG. 2 represents in fact a safety function SF that is implemented within a software process, namely, a program P, which is to be executed by the multiprocessor 10. In FIG. 2 the program P as a whole, which is a process that is executed cyclically, is represented by an annulus that represents cyclic execution in time t with a cycle time $T_{cyc}$. The safety function SF occupies a temporal segment of the aforesaid program P, i.e., a sector of the annulus, the safety function SF being in general a part of the program P, and hence being executed for a safe-execution time $T_s$ shorter than the cycle time $T_{cyc}$. Also indicated in FIG. 2 is how, during execution of the safety function SF, i.e., during the safe-execution time $T_s$, monitoring and control messages MC are exchanged, in particular with an independent control module 15.

As indicated in FIG. 1, the method described herein provides decomposing the program P into parallel subprograms P1, . . . , Pn, which, in the architecture of FIG. 1, are each implemented on a core 11. Even though a multiprocessor is illustrated in FIG. 1, the subprograms P1, . . . , Pn can be broken down even in the case where the processing system presents just one processor, for example via virtualization techniques. A technical solution available in the field of operating systems for multiprocessors is the virtualization technology, which enables precisely virtualization of the hardware on which application programs are run on a single core, or, as illustrated in what follows, also on the cores 11 of the multiprocessor 10 (reference is made, for example, to the so-called "hypervisors" or "virtual-machine monitors"). According to the paradigm of use of virtualization technologies, the program P is broken down into a plurality of parallel processes P1, . . . , Pn that can each be executed on a virtual machine V1, . . . , Vn so as to obtain a parallel execution, functionally equivalent to the starting program P, that comprises the safety function SF.

Decomposition into subprograms P1, . . . , Pn to be assigned to the various virtual machines or cores is guided, in known systems, by considerations of a functional nature regarding the functions of the specific program P. As is more fully described in what follows, the method disclosed herein provides, instead, carrying out the aforesaid operation of decomposition into subprocesses P1, . . . , Pn on the basis of the observance of given constraints of coverage in regard to the presence of failures of a random type that are required by the functional-safety standards provided in industrial and automotive applications. These constraints are hence referred to in general as functions f(k) of a level of coverage k required by the standard.

Figure 11:
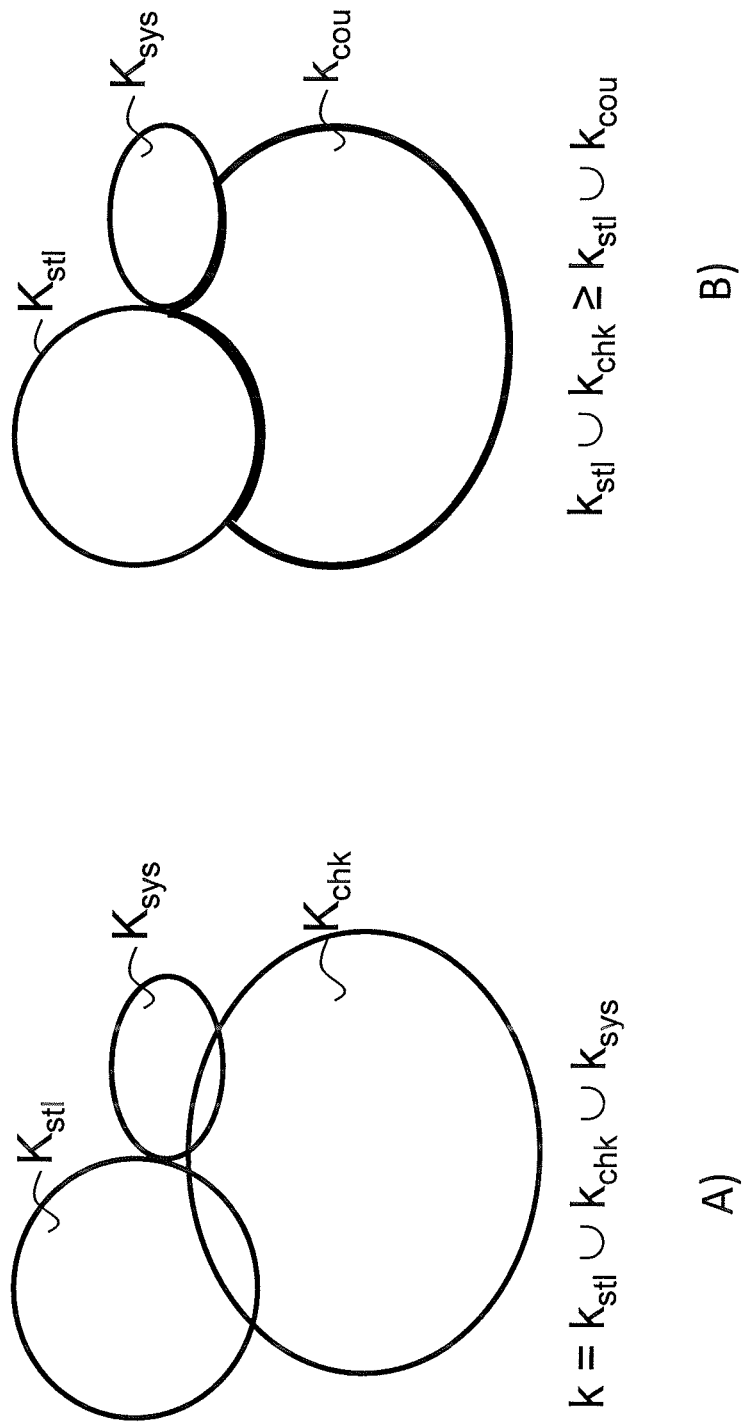
FIG. 11 shows a schematic diagram illustrating how self-test operations according to the method described herein function.

The functional-safety architecture of FIG. 1 is moreover configured for carrying out, in the framework of the safety function SF, self-test operations, described in greater detail with reference to FIG. 3, which in general comprise:

diagnostic-self-test operations $A_{stl}$, which carry out diagnostic tests, via execution of STLs (Self-Test Libraries) 50, associated to the processors 11, as indicated in FIG. 3;

operations $A_{sys}$ of self-testing of system values measured on the architecture, which are also preferably carried out via execution of the STLs 50;

applicational self-test operations $A_{chk}$, which may be operations of comparison between subprograms P1, . . . , Pn, via application-comparison software modules 60, described with reference to FIG. 3, in the sequel of the present description; however, as described with reference in particular to FIGS. 11 and 14, in the method according to the invention it is provided to carry out this applicational self-testing for operations of checking via periodic execution of conditions of use ($A_{cou}$) and/or periodic execution of LBISTs (Logic Built-in Self-Tests).

In this connection, indicated in FIG. 2 are the STLs 50 and the application-comparison software modules 60, which are associated to each of the cores 11 and each implement the three types of self-test operations $A_{stl}$, $A_{chk}$, $A_{sys}$. As has been said, preferably the STLs 50 comprise software for carrying out both the diagnostic-self-test operations $A_{stl}$ and the operations $A_{sys}$ of self-testing of system values measured on the architecture, but in variant embodiments the operations $A_{sys}$ of self-testing of system values can be carried out via a separate and dedicated software module.

The above three types of self-test operations $A_{stl}$, $A_{sys}$, $A_{chk}$ comprise generating on the multiprocessor 10 self-test data, i.e., diagnostic self-test data $D_{stl}$, system data $D_{sys}$, and application self-test data $D_{chk}$, respectively. As mentioned and represented more fully in FIG. 3, it is moreover provided to generate the above self-test data $D_{stl}$, $D_{sys}$, $D_{chk}$ in software modules represented by the diagnostic self-test libraries 50 and by the application-comparison software modules 60, and to send them in the monitoring and control messages MC so that checking operations will be carried out on the self-test data $D_{stl}$, $D_{sys}$, $D_{chk}$ via modules represented in FIG. 2 as logic modules 51, 61 comprised in the control module 15.

Illustrated once again in FIG. 1 are the communication systems 12 used for exchange of the monitoring and control messages MC between the processor modules that make up the multiprocessor 10 and the control module 15. The aforesaid communication channels may be made up of segments of a point-to-point type, or else created in a hierarchical way and possibly with multiple access to a shared physical medium, such as, in the example illustrated, a communication bus. Determination of the content of the monitoring and control messages MC to be exchanged is obtained by executing the self-test operations $A_{stl}$, $A_{sys}$, $A_{chk}$ in addition to other operations described in detail in what follows, and sending of the monitoring and control messages MC themselves is obtained during regular time intervals in which the processor modules 11 making up the multiprocessor 10 are ?diverted from execution of the respective application programs P1, . . . , Pn obtained from decomposition of the program P, to which they are normally dedicated for the most part of the time, and are assigned to execution of special code, i.e., the code of the programs of the self-test libraries 50. In particular, the monitoring and control messages MC are generated at different hierarchical levels or layers of organization of the software being executed in the multiprocessor 10, as described in greater detail in what follows. The exchange of monitoring and control messages MC between the system multiprocessor 10 and the control module 15 is obtained according to a communication protocol PL, which is also described in greater detail in what follows.

According to a main aspect of the method described herein, it is provided to carry out the operation of decomposition of the program P into a plurality of parallel subprograms P1, . . . , Pn so as to respect a failure-probability target, designated by g for the general case and by g12 in the two-processor example presented hereinafter, which is a function for each subprogram P1, . . . , Pn of a respective coverage value $k_{stl}$ determined by the aforesaid diagnostic-self-test operations $A_{stl}$, of a respective coverage value $k_{sys}$ determined by the operations $A_{sys}$ of self-testing of values measured on the multiprocessor architecture 10, and of a coverage value $k_{chk}$ determined by the applicational self-test operations $A_{chk}$.

The coverage in terms of DC (Diagnostic Coverage) or SFF (Safe-Failure Fraction—see, in this connection, the safety standard IEC 61508) of each component of the safety architecture in FIG. 1, in particular for the part of software program of the diagnostic-self-test operations $A_{stl}$ (STLs 50), is determined on the basis of the following characteristics of the system:

the SIL (Safety Integrity Level) to be achieved for the system, in particular a two-channel system; this results in a requirement of coverage k that is to be respected by the system;

base-cycle frequency $f_{cyc}$ of the operations and DTI (Diagnostic-Test Interval); in this regard, as illustrated in FIG. 2, the program P as a whole is executed cyclically with a cycle time $T_{cyc}$ and hence a base-cycle frequency $f_{cyc}$; the safety function SF occupies a temporal segment of the program P for a safe-execution time $T_s$ shorter than the cycle time $T_{cyc}$;

number and type of the checks made, in particular in the architecture considered, by the control module 15 on the results of the diagnostic-self-test operations $A_{stl}$ per unit time; the safe-execution time $T_s$ is a function f(k) of the constraint of coverage k required by the safety standard.

Furthermore, as is also described in detail in what follows, the operation of data exchange is executed with a sequence of messages in which an amount of data q and a frequency f are chosen according to a further function of the aforesaid failure-probability target g to be respected.

As additional step, there may be provided a check to verify whether the target values of coverage k determined as a function of the aforesaid failure-probability target g have been effectively achieved via fault injection in a simulation step, for example according to what is described in the patent No. EP 1 980 964 A1 filed in the name of the present applicant.

There now follows a detailed description of the operation of decomposition of the program P into a plurality of parallel subprograms P1, . . . , Pn according to a function of a failure-probability target g to be respected.

In order to obtain the lowest failure probability g without hardware modifications and with the minimum impact on the program P, understood both as size of the program memory and as execution time, the method described provides in fact decomposition of the program P into two or more independent programs P1, P2, . . . , Pn.

The functional-safety architecture described is set as a function of a failure-probability target g and hence as a function of values of coverage k to be achieved. Specific examples refer in what follows substantially to a two-channel system, i.e., one in which the program P is broken down into two processes P1 and P2 operating on two cores C1 . . . C2 or two virtual machines V1 . . . V2, which supply two channels of results.

Hence, taking as example the case of an operation of decomposition into two programs P1, P2 and assuming for simplicity that the two independent programs P1, P2 are executed on two identical processor modules 11 with the same basic failure probability λ equal to 1 and with the same distribution of failure models Λ equal to 1, the failure probability of the multiprocessor system made up of the processors 1 and 2 may be described as:

$$g12 \leq (1-\beta)^2 \cdot (1-s1) \cdot (1-k1) \cdot (1-s2) \cdot (1-k2) \cdot t\exp + \beta \cdot (1-s12) \cdot (1-k12) \quad (1)$$

where: k1 and k2 are the failure coverages for the two processors, for example C1 and C2, respectively, than execute the two programs P1 and P2; s1 and s2 are the safe-failure fractions of the two processors C1 and C2, respectively, that execute the two programs P1 and P2, respectively; β is the fraction of the failures that can cause a CCF (Common-Cause Failure) between the two processors C1 and C2; k12 is the failure coverage that can cause a CCF between the two processors C1 and C2; s12 is the fraction of the safe failures common to the two processors C1 and C2; and texp is the exposure time of the first failure. The time texp is defined by the type of use of the system and by the type of failure model, and in the limit may be equal to the service lifetime of the system. Given a subprogram P1, having assumed a base failure probability λ equal to 1 and a distribution of failure models Λ equal to 1, the pair of values si, ki, which are the safe-failure fraction of the corresponding processor and the failure coverage, respectively, identifies substantially the failure probability thereof.

Eq. (1) defined previously for the failure-probability target g12 of the two independent subprograms P1 and P2 is determined via the FTA (Fault-Tree-Analysis) arithmetic (see, for example, ISO 26262-10, Annex B); i.e., it corresponds (see FIG. 8) to determining the failure probability of the two subprograms P1 and P2, which are connected by a logic function of an AND type and in which the respective hardware, on which each program is executed, is linked to a very low failure probability. Hence, Eq. (1) expresses the resulting mean failure probability, i.e., the failure-probability target, approximately as a product of the respective probabilities and the exposure time t.

It is hence possible to extend easily Eq. (1) for an arbitrary number of independent programs: for example, in the case of three programs, the three-input AND gate can be broken down into two two-input AND gates, and then the resulting formula can be constructed using Eq. (1) appearing above for two programs P1 and P2.

In other words, the value of failure probability of the subprograms P1, ..., Pn with respect to a failure-probability target g to be respected is calculated by considering the subprograms P1, ..., Pn as inputs of an AND gate having as many inputs as are the subprograms, breaking down the aforesaid AND gate into two-input AND gates, and calculating the probability target as a function of the product of the failure probabilities at output of each two-input AND gate and the execution time.

Once again applying the FTA arithmetic, the failure probability g12 is completed by adding (namely, via application of a logic function of an OR type) a common-cause term β·(1−s12)·(1−k12) that takes into account the CCFs.

Hence, the calculation of the aforesaid failure-probability target g comprises: considering the subprograms P1, ..., Pn as inputs of an AND logic function AG having as many inputs as are the subprograms P1, ..., Pn; breaking down this AND logic function AG into two-input AND logic functions having as inputs the pairs of the aforesaid subprograms P1, ..., Pn that can be formed, and calculating the product of the failure probabilities at output from each two-input AND gate, multiplied by the complement of the common-cause-failure fraction β, and of the exposure time texp, calculating the aforesaid probability target g as a function of the result of the previous operation added to a value obtained by applying OR functions to common-cause failures, i.e., the pairs ki, si for all the pairs ij of subprograms P1, ..., Pn, and by multiplying the result obtained by the common-cause-failure fraction β.

Figure 8:
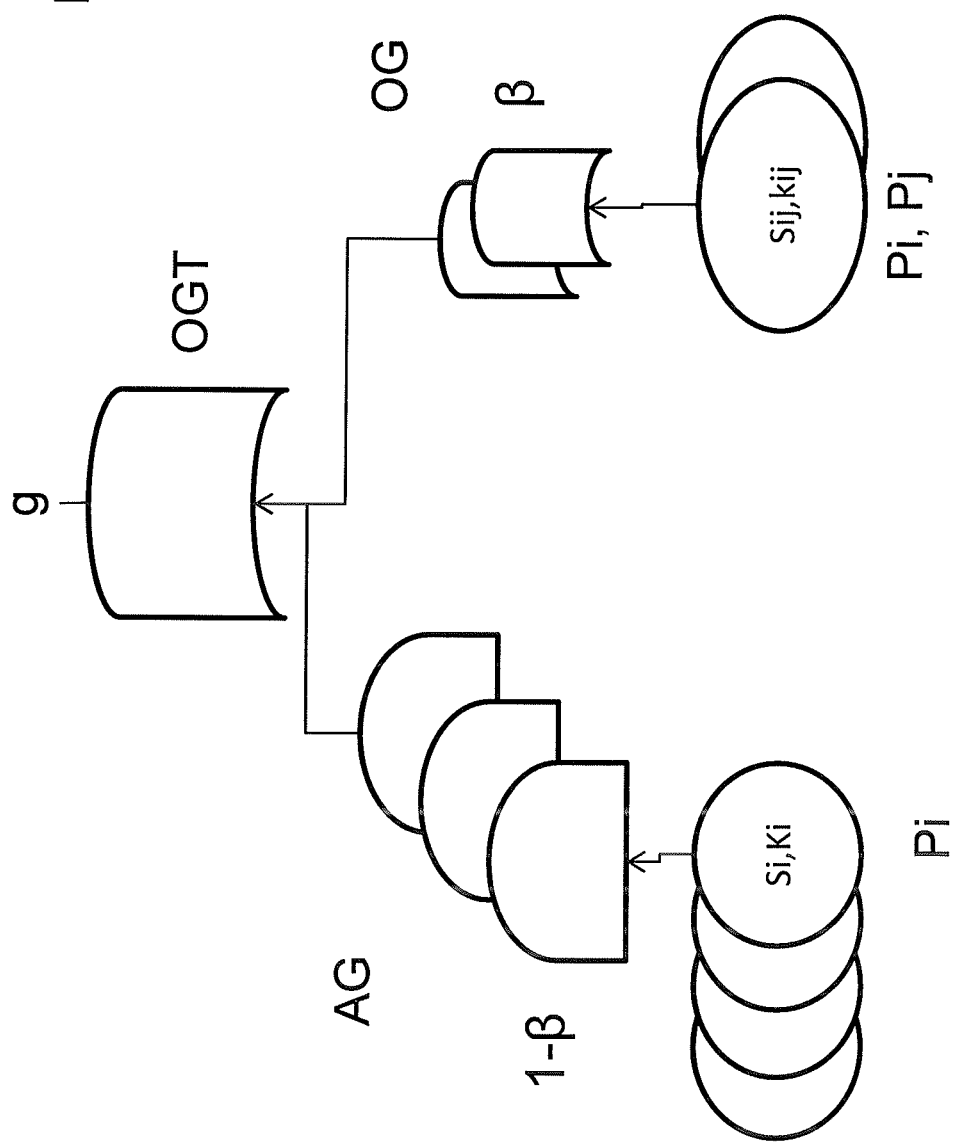
FIG. 8 shows a logic diagram representing an example of logic implementation of a decomposition operation of the method described herein.

FIG. 8 illustrates, via a logic circuit, the operation of calculation of the probability target g by implementing the logic functions according to what has just been discussed. Designated by AG is the n-input AND gate, which can be broken down into two-input gates according to what has been described above and which receives as input for each subprogram Pi the coverage ki and the safe-failure fraction si (in the example of Eq. (1) k1, s1 and k2, s2). The output is multiplied by 1−β, which is the one's complement of the fraction of the failures that can cause a common-cause failure. The AND gate (as envisaged in FTA arithmetic) computes the multiplication by the exposure time. Designated by OG are multi-input OR gates that for two subprograms Pi and Pj receive as input the common-cause-failure coverage kij and the common-cause safe-failure fraction sij (in the example k12, s12). The output is multiplied by β, which is a fraction of the failures that can bring about a common-cause failure. A gate OGT then computes the sum of the outputs of the gates AG and OG to yield the general form g of the failure target g12 of Eq. (1).

One of the characteristics that distinguish the method is that the failure coverages k1, k2, and k12 are defined as the combination of three contributions:

$k_{stl}$, i.e., the coverage fraction guaranteed by execution of the diagnostic-self-test operations $A_{stl}$ (carried out via the STL 50, in particular in co-operation with the module 51 present on the module 15);

$k_{chk}$, i.e., the coverage fraction guaranteed by the applicational check on execution of the programs P1 and P2 in a target time T—typically calculated as corresponding to the PST (Process Safety Time) or FTTI (Fault-Tolerant Time Interval), i.e., by the self-test operation $A_{chk}$ (carried out in the comparison component 60, in particular in co-operation with the module 61 present on the control module 15);

$k_{sys}$, i.e., the coverage fraction guaranteed by the comparison of the system-self-test data $D_{sys}$, obtained from the operation $A_{sys}$ of self-testing (carried out, preferably once again in co-operation between modules of the multiprocessor 10 and of the module 15) of system parameters measured on the multiprocessor architecture 10, such as the temperature and the voltage of the processors C1, C2 on which the programs P1 and P2 are executed, with reference values or limit values, i.e., ranges $R_{att}$.

In particular, for the coverages k1, k2 of the programs P1 and P2 and for the common-cause coverage k12 we have:

$$k1 = k_{stl1} \cup k_{chk} \cup k_{sys}$$

$$k2 = k_{stl2} \cup k_{chk} \cup k_{sys}$$

$$k12 = k_{stl2} \cup k_{chk} \cup k_{sys} \quad (2)$$

The union operator ∪ indicates that the two coverages are combined according to the rules of set theory as a function of their individual failure coverage.

The coverage target of the STLs, namely, $k_{stl1}$ associated to the library 50 included in the program that is executed by the processor C1, $k_{stl2}$ associated to the library 50 included in the program that is executed by the processor C2, and $k_{stl12}$ associated to the library 50 included in the program that is executed by the processor C1 and/or the processor C2, for covering the common-cause failures—and hence the structure and the programming of the libraries—is determined with the purpose of achieving the failure-probability target g12 as a function of the parameters β, t, and s1, s2, and s12.

Hence, in practice, the method includes providing in the safety architecture three different types of self-test operations $A_{stl}$, $A_{chk}$, $A_{sys}$, to which coverages $k_{stl}$, $k_{chk}$, $k_{sys}$ are associated and, given a number of subprograms P1, ..., Pn into which the functional-safety program P has been broken down, for each type of self-test operation $A_{stl}$, $A_{chk}$, $A_{sys}$, associating the aforesaid self-test operation $A_{stl}$ or $A_{chk}$ or $A_{sys}$ to each subprogram P1, ..., Pn and/or processor 11, defining the parameters of the self-test operation $A_{stl}$ or $A_{chk}$ or $A_{sys}$ so that the resulting values of coverage $k_{stl}$ or $k_{chk}$ or $k_{sys}$ will respect, together with the ones deriving from the other two types of self-test operations according to what is expressed in Eq. (1), the failure-probability target g defined for the system.

According to a further aspect of the method described herein, the aforesaid:

operation $A_{stl}$ of diagnostic-self-test on the basis of the self-test libraries 50 defined with respective self-test coverages $k_{stl1}$, $k_{stl2}$ and $k_{stl12}$ for the two processors C1 and C2, operation $A_{chk}$ of applicational checking of the programs P1 and P2, with applicational coverage $k_{chk}$, and operation of comparison $A_{sys}$ of system-self-test data $D_{sys}$ of the processors C1, C2 on which the programs P1 and P2 are executed with expected ranges $R_{att}$, which identifies the system coverage $k_{sys}$ are not executed entirely by the multiprocessor 10, but are completed in sequence via a further element that is independent of the multiprocessor 10, namely, the control module 15. This is obtained via an exchange of data (the messages MC) between the multiprocessor 10 and the control module 15.

The correspondence of the coverages $k_{stl1}$, $k_{stl2}$, $k_{stl12}$, $k_{chk}$, and $k_{sys}$ with respect to the target values determined as described above is tested via failure injections during simulation.

Hence, the method described herein provides operating in a context of electronic systems with functional safety that execute a given program P, where the operation of decomposition of the program P into subprograms and partitioning of the self-test operations into three separate operations, namely, self-testing $A_{stl}$ via diagnostic tests, self-testing $A_{sys}$ via monitoring of the system values, and self-testing $A_{chk}$ via applicational check, according to a relation, Eq. (1), that links the failure target to the coverages of the subprograms, which are in turn defined as a function of the coverages $k_{stl}$, $k_{chk}$, $k_{sys}$ of the three self-test operations $A_{stl}$, $A_{chk}$, $A_{sys}$, enables precise identification of the coverage targets to be assigned to each of the three self-test operations, likewise enabling distribution of the targets in an optimised way.

The architecture described with reference to FIG. 1 moreover provides carrying out the aforesaid self-test operations in co-operation with an external module, the control module 15, via a communication protocol PL for exchange of monitoring and control messages MC. By "external module" is here meant a module external to the processors 11, even though this module may be included in the integrated circuit in which the processors are provided. The method described provides, that is, self-test operations that, unlike the self-test operations executed in known systems, which generate and check the self-test data in one and the same single-processor or multiprocessor processing system, provide generating the self-test data within the single-processor or multiprocessor processing system, but completing the self-test operation by carrying out the check via a separate independent element, the control module 15.

In order to describe in greater detail the above and other aspects, FIG. 3 illustrates schematically an abstract model of an embodiment of the solution described, through a hierarchy of physical and software layers, of an ISO/OSI type, which also represents the communication protocol PL.

The above communication protocol PL is implemented at hierarchical layers in which the messages at the application layer (L4 in FIG. 3) are encapsulated in the protocol PL implemented by the program P, and at a lower layer (layer L2 in FIG. 3) the messages corresponding to the STLs 50 are added. As illustrated in FIG. 3, the control module 15 implements the communication protocol PL in a specular way with respect to the aforesaid hierarchical layers. The aforesaid protocol PL arranges the monitoring and control messages MC in a hierarchical frame that enables encapsulation of different packets for different identifiers ID of different processor modules 11 and their routing within the control module 15 towards the processing units responsible for their analysis and comparison, as is represented in greater detail with reference to FIG. 6. In what follows, designated by VC are the logic channels that address a specific system layer, designated by ID are the identifiers that address the physical channels referring to a processing element, designated by C1, ..., Cm are physical cores, and designated by V1, ..., Vm are virtual machines. In particular, in the protocol PL a message MC, of a packet type, comprises the following fields for numeric values:

fields dedicated to hierarchization of the messages MC as a function of the logic channels VC to which they belong;

fields for the cardinal and temporal sequence of the packets of the messages MC;

field of commands for the control module 15; and payload field containing the datum with respect to which the control module 15 must complete the self-test operation.

The control module 15 is moreover configured for carrying out a check of integrity on the content of the message MC by means of an algorithm that enables error detection and/or correction. Preferably, the algorithm CRC32 is used as error-detection algorithm (in FIG. 7 it is implemented in the module 112a).

Entering into greater detail of the representation of the physical and software hierarchical layers in FIG. 3, designated by L1 is a hardware-execution physical layer, corresponding to the multiprocessor 10, which comprises a multiplicity of cores C1, ..., Cm and an input/output module 10. This is typically implemented by one or more integrated circuits.

Designated by L2 is a supervisor layer L2, represented by a virtual-machine-management module 17, a software component commonly referred to as "hypervisor", which has the function of virtualization of the existing hardware of the physical layer L1 making available at a virtualization layer L3 a number n of virtual machines V1, ..., Vn with corresponding operating system such that they can be used as independent units, the so-called "guest virtual machines". The virtual-machine-management module 17 guarantees that the various virtual machines V1, ..., Vn and the corresponding subprograms P1, ..., Pn, into which the program P is to be broken down, for example manually, will have given characteristics necessary for the program P. The decomposition operation may alternatively even not be protected, or protected via modifications of the application itself or rather of its operating system. In the field of application of functional safety the aforesaid characteristics typically include guaranteeing real-time execution and non-interference between execution of different processes. As has been mentioned, the method described herein provides, instead, that the aforesaid characteristics will take into account only or also a failure-probability target g. In general, a number n of virtual machines is provided equal to the number of the subprocesses P1, . . . , Pn into which the program P is broken down, where, in the preferred example n=2. Since a number of virtual machines can be obtained on one and the same core, the number m of cores is preferably less than or equal to n.

The virtual-machine-management module 17 described herein comprises a software component corresponding to the STLs 50, which, as has been mentioned, introduce a test on functional integrity of each of the cores C1, . . . , Cm, as well as peripherals that constitute the hardware underlying it, i.e., the physical layer L1, so as to guarantee that possible failures of a random type that were to arise in the above underlying hardware are detected with a pre-defined percentage of coverage k. There may be just one library 50 in the case of a homogeneous multiprocessor. The modalities with which a software component, here the component of the STL 50 (or the components of the STL 50 in the case of a non-homogeneous multiprocessor), is integrated in the virtual-machine-management module 17 are in themselves known to a person skilled in the sector. The component of the STL 50 may be easily integrated in the virtual-machine-management module 17, in so far as the modules of such a type, for example the hypervisors, which are provided with the known virtualization systems, typically present to the user interfaces that enable integration of additional components. Consequently, it is possible to integrate the component of the STL 50 as additional component, as illustrated in FIG. 3.

An application layer L4 corresponds to the level of the subprograms P1, . . . , Pn into which the program P is broken down and which are implemented on the virtual machines V1, . . . , Vn. Associated to this application layer L4 is an application-comparison software module or component 60, in particular one for each process P1, . . . , Pn, specifically referred to as "application safety layer" (ASL), which in general carries out the self-test operation that generates the application-self-test data $D_{chk}$, for example, through comparison between the intermediate results of the channels or by checking execution of conditions of use or execution of LBISTs. More specifically, as has been said, in the method described herein, the application-comparison software module or component 60, in particular one for each process P1, . . . , Pn, obtains the application-self-test data $D_{chk}$, which are then checked and compared in the control module 15.

Figure 6:
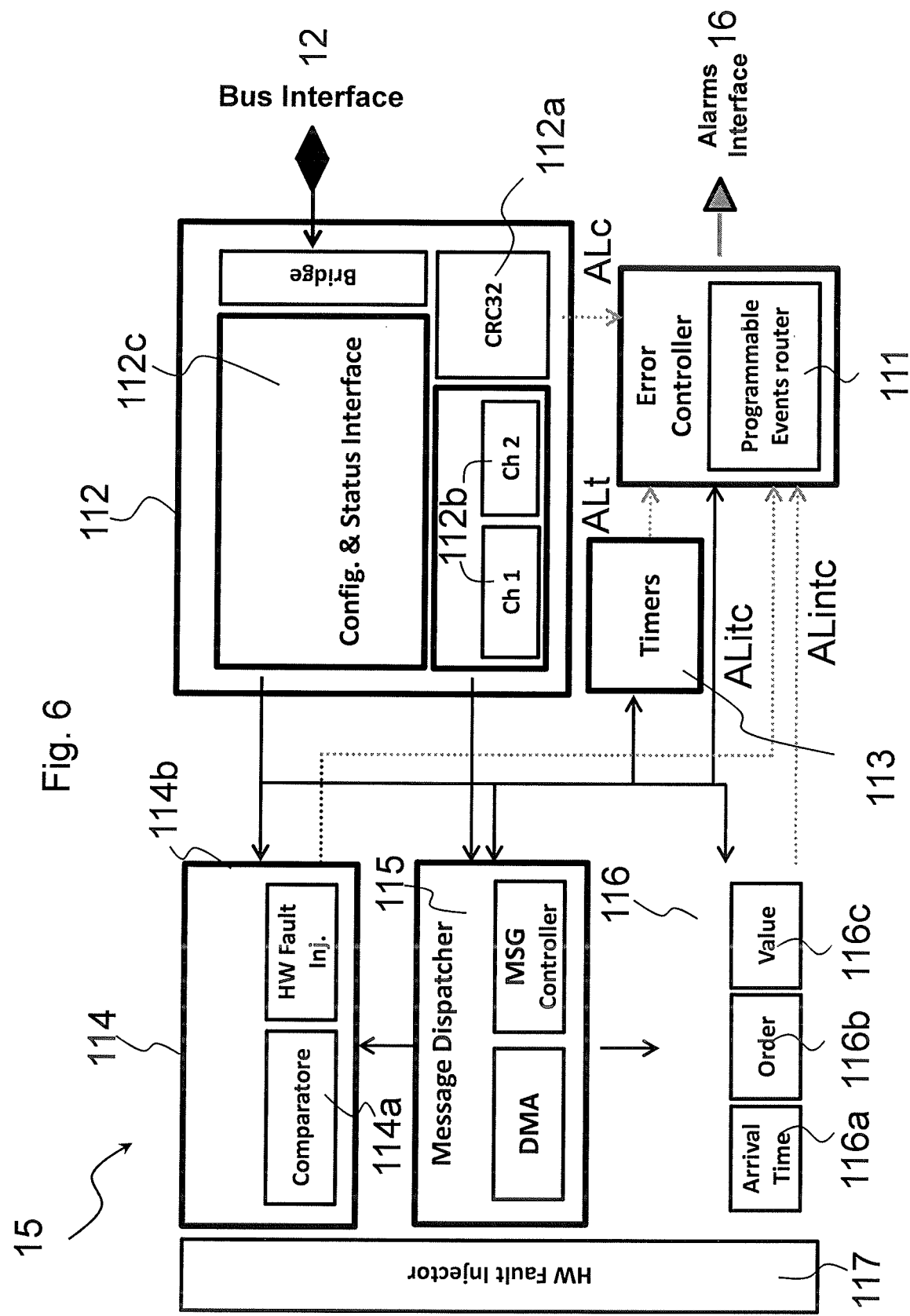
FIG. 6 shows a block diagram of a control module that co-operates with the multiprocessor architecture for implementing the method described herein.

In FIG. 3, the control module 15 is represented as a hardware component, shown in detail in FIG. 6. However, it may also be implemented as software in an equivalent way, with differences in the cost/performance ratio of the resulting component. Purely by way of example, the control module 15 may be implemented as a program executed by a further processor.

The monitoring and control messages MC exchanged with the control module 15 for completing the self-test operations $A_{stl}$, $A_{sys}$, $A_{chk}$ are divided into two distinct types:

messages containing data that are independent of the characteristics of the program P executed by the microprocessor 10; these are, for example, the system-self-test data $D_{sys}$ generated by the operations $A_{sys}$ of self-testing of the system values measured on the architecture, which include measurements of voltage and/or temperature of the cores C1, . . . , Cm of the multiprocessor 10, as well as diagnostic-self-test data $D_{stl}$ regarding intermediate results of calculations made in accordance with one of the specific diagnostic-self-test procedures of the self-test libraries 50; and messages that contain data regarding applicational testing and that hence depend upon the program P or application itself or data regarding checking execution of conditions of use or execution of LBISTs; these are the application-self-test data $D_{chk}$ generated by operations $A_{chk}$ of comparison between the subprograms P1, . . . , Pn, via application-comparison software modules 60.

The control module 15 completes the self-test operations $A_{stl}$, $A_{sys}$, $A_{chk}$ started in the multiprocessor 10, via co-operation and exchange of the messages MC, which contain the corresponding self-test data $D_{stl}$ and $D_{chk}$, with the corresponding self-test logic components 51 and application-comparison logic components 61 comprised in the control module 15. As illustrated in FIG. 6, this separation is of a logic type; however, the components 51 and 61 may be implemented via one and the same set of hardware modules. This is obtained, for example, as follows:

the control module 15 completes the diagnostic-self-test operations $A_{stl}$ by making the comparison, in the logic module 51, of the diagnostic-self-test data $D_{stl}$ regarding intermediate results of calculations made on the cores C1, . . . , Cm of the multiprocessor 10 according to one of the specific diagnostic-self-test procedures of the self-test libraries 50 with a set of pre-calculated and expected values $D_{stla}$ stored in the aforesaid control module 15 and detects possible common-cause failures (CCFs); possible differences between the aforesaid diagnostic-self-test data $D_{stl}$ and the set of pre-calculated and expected values $D_{stla}$ indicate the effect of a failure (whether permanent or transient) in the logic or in the status of the cores C1, . . . , Cm of the multiprocessor 10;

in parallel, the control module 15, by making the continuous comparison in the logic module 61 of application-self-test data $D_{chk}$ produced independently by a pair of processor modules 11, whether virtual machines or cores, in effect performs a function of cross-check between the two corresponding safety channels;

the control module 15 completes with a check also the operation $A_{sys}$ of self-testing of system values measured on the architecture by checking whether the system-self-test data $D_{sys}$ fall within the expected ranges $R_{att}$, which are likewise stored in the control module 15.

The control module 15 makes the aforesaid checks on the monitoring and control messages MC according, for example, to the following criteria for the comparison:

it considers just the order of arrival of the messages MC and whether they belong to the cycle considered for the comparison; hence, preferably, the absolute arrival time of the individual messages MC is not considered, even though in alternative embodiments it may be considered;

the control module 15 is configured for enabling interposition of messages MC from different sources, i.e., from different processor elements 11, in this case two, duly respecting the order within the sequences for each of the two processor modules 11, as indicated previously; and the control module 15 applies its own checks on a cyclic basis, completing the checks for each of the cycles defined by the cycle time $T_{cyc}$.

There now follows a more detailed description of the STLs 50 and the complementary logic modules 51.

The STLs 50 have the dual function of:

implementing the self-test operation represented by the operation $A_{stl}$ of diagnostic self-testing of the multiprocessor processing system 10; this diagnostic-self-test operation $A_{stl}$ is typically obtained by comparing results of calculation, the diagnostic-self-test data $D_{stl}$, processed at the moment of the test itself by the multiprocessor 10, with pre-calculated and stored correct results, the expected results $D_{stla}$, so as to check that the multiprocessor 10 calculates and executes correctly the program sequences assigned to it; these calculation results $D_{stl}$ are typically obtained from the sequence of operations of an arithmetic, logic, and addressing type so as to involve in the most complete, extensive, and exhaustive way the various circuit parts of the microprocessor 11; as has been said, in the method and architecture described herein, the operations of comparison with the expected values $D_{stla}$ are implemented in co-operation with an external processing module, the control module 15 (i.e., with the co-operation of the modules 50 and 51 in the hierarchical representation of FIG. 3); and measuring system-self-test data $D_{sys}$, i.e., measuring global parameters, regarding operation and/or the conditions of operation of each microprocessor; preferably, quantities such as the operating voltage of the microprocessor and the temperature of the system or else the temperature inside the microprocessor are measured; this function has particular importance in identifying situations of possible failure of the microprocessors and in particular situations that may determine common-cause failures in the microprocessors; the above system-self-test data $D_{sys}$, as has been said, preferably are also obtained via corresponding programs comprised in the libraries 50, even though they may be provided in separate libraries and are checked against the expected ranges $R_{att}$, in the logic modules 51.

In particular and as regards the diagnostic-self-test operations $A_{stl}$ that supply the diagnostic-self-test data $D_{stl}$, the self-test code is typically made up of a set of test segments, designated by 202 and described in further detail with reference to FIG. 7.

The above test segments are preferably specialized for testing one or more functional units of the microprocessor, of the multiprocessor processing system 10 in this case, in accordance with the targets of an analysis of a FMEDA (Failure Modes Effects and Diagnostic Analysis) type conducted at the integrated-circuit level and, in particular, on the individual cores C1, . . . , Cm, or individual processors. The above FMEDA can be carried out, for example, following the procedure described in the patent application No. EP 1 980 964 A1 filed in the name of the present applicant. The overall target of the test segments that make up the STL 50 of each of the cores C1, . . . , Cm is to achieve a level of coverage, specifically a self-test coverage $k_{stl}$ or system coverage $k_{sys}$, such as to satisfy the coverage constraint f(k) pre-established on the entire logic making up the core C1, . . . , Cm. This is usually an extremely difficult problem for microprocessors with advanced architecture (with deep pipeline, of the super-scalar, multi-issue type), and the difficulty increases markedly as the complexity of the microprocessor undergoing self-diagnostics increases. The functional-safety standard relevant to the application sector defines the minimum requirements for integrity of the system and of the various components of the system.

Hence, the various segments that make up the library 50 must be designed for achieving as a whole, on the entire microprocessor, or core, a target value of coverage $k_{stl}$ such as to enable—via a calculation procedure like the one described hereinafter by applying Eq. (1)—a level of integrity to be achieved higher than or equal to what is envisaged by the relevant safety standard.

The programs of the diagnostic-self-test library 50 are typically organized in modular form for reasons of expandability with respect to the various functional units of the microprocessor to be tested and the specialization of simpler units, the test segments 202, on each of the functional units of the microprocessor.

Figure 7:
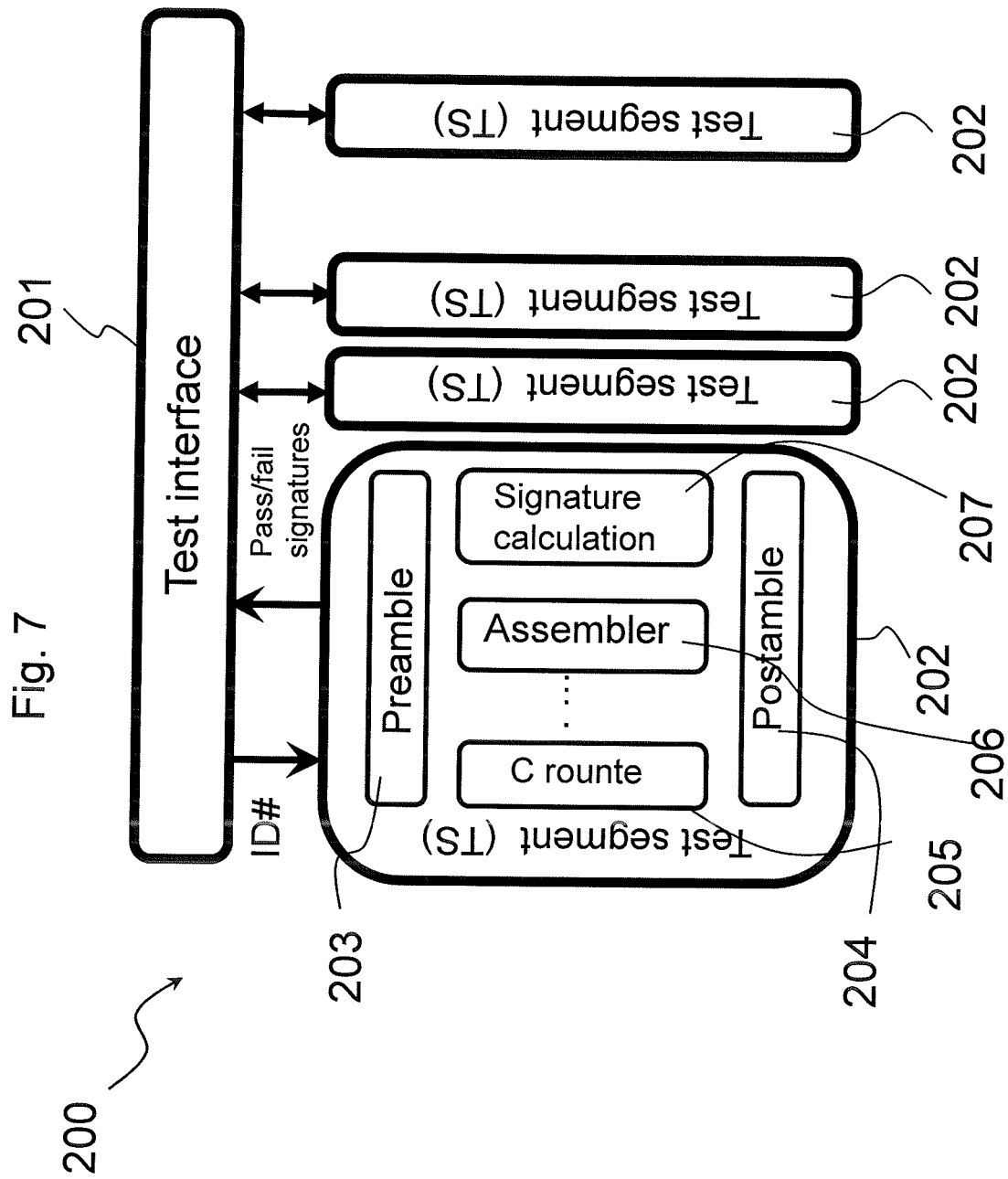
FIG. 7 is a schematic illustration of a testing program executed by the multiprocessor architecture described herein.

FIG. 7 represents schematically in this connection a self-diagnostic program of the self-test library 50, designated by 200. Test segments 202 comprised in the program 200 are invoked, by indicating the identifier ID # of a test segment to be executed, by a software layer referred to as "test interface 201" that provides the interface towards the software that invokes the self-diagnostic program of the library 50 on a cyclic and regular basis. The test segment 202 replies by sending a pass/fail signature.

The structure of a test segment 202 is once again of a modular type organized by successive stages, and comprises a preamble 203 and a postamble 204 typically written in a high-level language (ANSI-C), i.e., independent of the architecture of the microprocessor undergoing self-testing. The preamble 202 and the postamble 204 are dedicated to the functions of interface towards the higher layer, to management of the global variables, and to the results of the test that are to be managed with techniques that enable detection of any error that might afflict the result of the test when this is processed by the software modules.

The heart of the test segment 202 is represented by a series of modules 206 written in low-level code, usually Assembler, specific for the architecture of the microprocessor, referred to in the figure as "ASM core code". These modules 206 are the parts that effectively carry out self-testing in so far as they stimulate in a targeted way the various logic and arithmetic and sequential units of the microprocessor so as to activate and render observable a possible failure of the microprocessor itself. The various modules 206 in low-level code can be managed by routines 205 written in high-level language. The test segment 202 comprises a signature calculator 207 for generating the pass/fail signatures at the end of the checks via the modules 205 and 206. The test segments 202 comprise a plurality of modules 206 in low-level code for obtaining a coverage target for the failures, considering a given set of failure modes defined by the safety analysis.

There now follows a description of the distribution of the self-test operations, specifically of the diagnostic-self-test operations $A_{stl}$, between the STLs 50 on the processors 11 and the logic components 51 on the control module 15.

Operation of the STLs 50 is based upon the capacity of a microprocessor to test itself by executing code sequences such as to involve as much as possible the various logics that make it up and producing intermediate results that, appropriately accumulated so that possible errors in the intermediate results cannot be cancelled out, may then produce signatures that, when compared with the same values pre-calculated assuming absence of failures, will yield the highest confidence of detection of a possible failure that were to have afflicted the logic undergoing testing. The capacity of activating and detecting the failure depends both upon the capacity of the test of the STL 50 to activate the failure and upon the numeric method used for accumulating the intermediate results so that any possible difference in the intermediate results cannot be cancelled out during the accumulation process. For reasons of clarity, there may be various types of results produced by the STLs 50 in the microprocessor, namely, intermediate results, accumulations, and signatures, the latter two frequently amounting, according to the embodiments, to the same thing. Accumulation is typically necessary for reducing the number of intermediate results that would otherwise not be manageable. In what follows, for simplicity, reference will be made to the intermediate results, including in this definition all three types of result referred to above.

Detection of activation of the failure in the single microprocessor may occur through two distinct mechanisms:

a) detection made by the self-test software itself, which, by detecting a difference in the comparison of the diagnostic-self-test data $D_{stl}$ with the pre-calculated ones, i.e., the expected results $D_{stla}$, determines the error and programmatically adopts countermeasures, pointing out the error detected; this is the typical case in which a failure does not afflict the logic responsible for control of the program flow, but only the part of arithmetic/logic calculation of the data;

b) stimulation determined by execution of the tests of the STLs 50, jointly with occurrence of a failure, which determines an error in the sequence of execution of the program P such as to violate control limits on the execution time t, which are supervised by an external watchdog that notifies the error; this is the typical case where a failure afflicts the logic responsible for control of the program execution flow; note that the watchdog may be a dedicated component of the system or else another core that, by carrying out a cross check, manages to detect an erroneous functional or temporal behaviour of execution of the test of the STLs 50 on the microprocessor considered.

In the above context, the STLs 50 indicated in FIG. 3 generate diagnostic-self-test data $D_{stl}$, which comprise data regarding the self-test process or else intermediate results (or partial results, accumulations of intermediate results, or else results of the comparison between intermediate results and expected values), which are sent to an external module, the control module 15, which carries out cross-comparison between the diagnostic-self-test data $D_{stl}$ (mechanism a) and control of the execution flow (in this way performing the functions of the external watchdog in the context of the mechanism b of stimulation of the STL tests, as described above).

The STLs 50 moreover generate the measured values, including system configurations, i.e., the system-self-test data $D_{sys}$.

The STLs 50 generate corresponding messages MC containing the above diagnostic-self-test data $D_{stl}$ and system-self-test data $D_{sys}$, to the control module 15, which processes, via the logic components 51, the aforesaid messages generated by the STLs 50 executed on the physical cores C1, ..., Cm of the multiprocessor 10.

Such processing performed in the logic components 51 is configured for carrying out the following operations:

carrying out a cross check on the diagnostic-self-test data $D_{stl}$,
both by implementing an (intra-channel) check of execution flow on the results of the comparison made by the microprocessors C1, ..., Cm
and by making an (inter-channel) cross-check on the partial result obtained from processing of the tests of the libraries 50 on each of the microprocessors C1, ..., Cm.

carrying out a check on proper temporal execution by checking that the results of the comparison, i.e., the partial results, are sent and received within predetermined time windows (characterized by a maximum and minimum latency) and according to a pre-set order; this enables detection of possible errors in execution of the flow, as indicated previously, as mechanism of detection of the errors in the flow of execution of the tests of the STLs 50 that requires the aid of an external component; and carrying out a check on whether the measured values $D_{sys}$ actually belong within pre-defined ranges of variability for the quantities being measured (typically, operating voltage and temperature); in addition, there may be carried out checks of consistency of the system configurations that are acquired by the STLs 50 and that represent the status of the system during execution.

Violation of one of the checks just described implies, by the control module 15, generation of an alarm AL, as indicated in FIG. 6, and implementation of the countermeasures necessary for safety application. The aforesaid alarm-generation functions send alarms to a module 16, which is a module that controls system resources in the system 10, and may, for example, implement a reset or remove the supply voltage or in any case force reaching of a safe status of the system.

An example of flow of operations associated to the self-test library 50 is the following:

```
Repeat forever{
    receive data from all the programs of the
    self-diagnostic libraries that are executed on the
    multiprocessor 10, on the supervisor layer, or
    directly on each of the physical cores
        divide and organize data according to the
    core, virtual channel, and type
        align the intermediate results corresponding
    to each program of the libraries 50; check the
    maximum skew between corresponding intermediate
    results and the maximum latency
        carry out a cross check between the
    intermediate results of the libraries 50 and
    detect errors
        gather the measurements from different cores;
    check the maximum skew between corresponding
    intermediate results and the maximum latency
        carry out checks on the range and identify
    violations
}
```

As emerges also from FIG. 6 with reference to the module 116, the control module 15 executes multiple checks of value, order, time (latency, skew, and absolute arrival time using timestamps), and ranges (in the module 114 with comparator). In particular, the following checks are carried out on the self-test data $D_{stl}$, $D_{chk}$, $D_{sys}$:

the check on the values verifies that the intermediate results are the same or that the execution of the conditions of use or of the LBISTs is respected;

the check on the order verifies that the order of the messages is correct according to counters in the message;

the check on the arrival times compares the time of arrival of the message against an expected minimum and maximum time within the current cycle of execution and/or with the corresponding message from another core; and the check on the ranges verifies that the value measured belongs to the pre-defined range $R_{att}$.

Any violation of the checks is managed by the control module 15, which notifies an error and then sends alarms to the module 16.

There now follows a more detailed description of the application-comparison software components 60 and of the complementary logic modules 61 present in the control module 15.

Hence, as indicated in FIG. 3, present in the subprograms P1, . . . , Pn executed on the virtual machines V1, . . . , Vn are the application-comparison software components 60 that implement the ASL (Application Safety layer), i.e., procedures of detection of partial results of processing of the subprograms P1, . . . , Pn or else execution of conditions of use or of LBISTs. The application-comparison software components 60 also carry out accumulation of the aforesaid partial results and detect differences on the results accumulated (for example, the accumulation of a CRC—cyclic redundant check) by the program with safety function SF. The applicational-comparison software components 60 also organise the data of the results accumulated and of the differences, or of the conditions of use or the LBISTs, in frames of application data $D_{chk}$ according to the protocol PL, which also forms the subject of the method described herein.

As already mentioned, also the application-comparison software components 60 have corresponding application-comparison logic components 61 in the control module 15. On the application-self-test data $D_{chk}$ the control module 15 carries out cross comparisons, in particular by checking the consistency of the information on the basis of the values of the application-self-test data $D_{chk}$, their order, and the clock time appearing in the packets of application-self-test data $D_{chk}$ generated by the application-comparison software components 60.

Described now in further detail is the communication protocol PL. The organization of the self-test operations $A_{stl}$, $A_{sys}$, $A_{chk}$ provides definition of different types of sets of messages within the protocol PL according to the software layers L2, . . . , L4 that have generated the message and to the purpose of the message itself.

The following logic channels, or virtual channels, VC are defined. Each of the logic channels VC carries messages coming from at most two different physical channels designated by ID0 and ID1:

VC0: safety VC—safety logic channel originated at the application layer L4 by the program with safety function SF (physical channels with identifiers ID0 and ID1);

VC1: supervisor VC—logic channel originated by the supervisor layer L2 or by the application layer L4, according to the implementation (physical channels with identifier ID0); and VC2: Q&S—quality-and-service logic channel, originated by the supervisor layer L2 or by the virtual-machine and operating-system layer L3, according to the implementation, which carries out maintenance operations on the system (physical channels with identifiers ID0 and ID1).

In the preferred embodiment with two physical channels we have that:

the logic channels VC0 and VC2 support two physical channels ID0 and ID1, which hence are safety channels; and the logic channel VC1 supports only one physical channel, ID0.

The above definition of the logic channels VC reflects in a particular characteristic of the control module 15 so that it is possible to configure programmable checks and alarms for each of the categories of the sets of messages.

Figure 4:
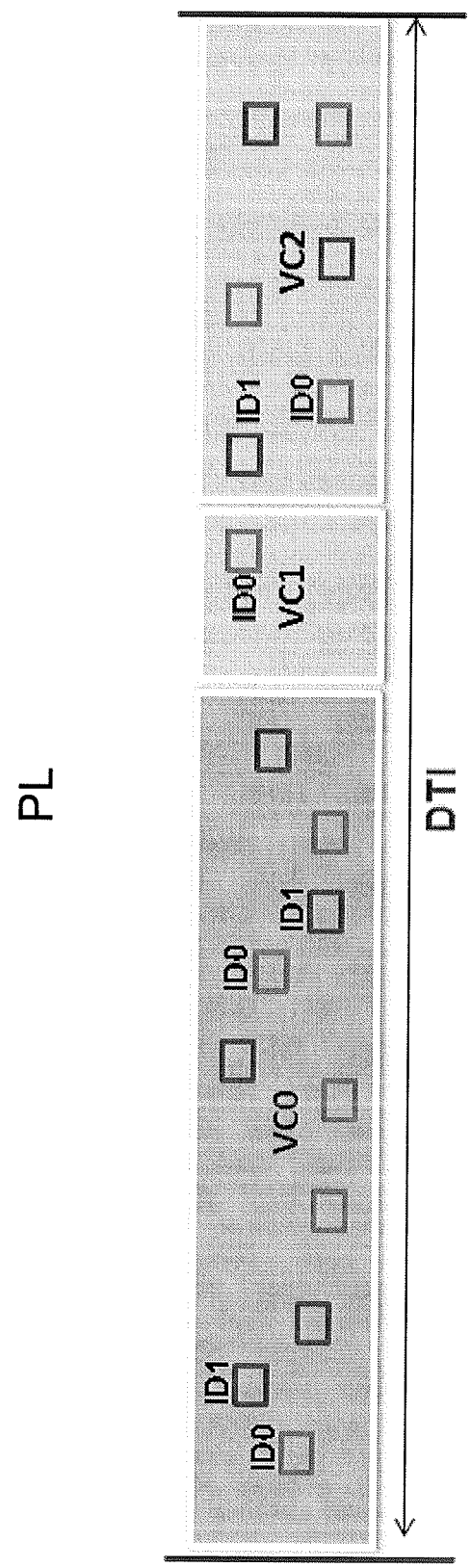
FIG. 4 and FIG. 5 show diagrams representing packets used by a communication protocol implemented by the multiprocessor architecture.

In a preferred embodiment of the control module 15, the order of transmission of the different logic channels VC, for example VC0, VC1, and VC2, is predetermined and fixed. FIG. 4 shows an example of a possible embodiment of the communication protocol PL that is reflected by the comparison logic of the control module 15. Shown in particular is the communication channel in which, within a diagnostic-test interval DTI, the logic channels VC0, VC1, VC2 are sent according to the communication protocol PL:

logic channel VC0, for the physical channels ID0, ID1—this carries the data of the safety function SF, i.e., the application-self-test data $D_{chk}$, the consistency of which with the components 61 of the control module 15 is tested: homologous messages belonging to the channels ID0 and ID1 are compared with one another, and the comparison must yield the correct result, i.e., data that, for example, are the same but for differences, such as encoding differences; the data could in fact be encoded in a different way (for example, complemented in a channel) in order to reduce the probability of common-cause errors;

logic channel VC1, for the physical channel ID0—this carries the diagnostic-self-test data $D_{stl}$ of the diagnostic-self-test library 50 that come from the supervisor layer L2; and logic channel VC2, for the physical channels ID0, ID1—this carries the values measured, i.e., the system-self-test data $D_{sys}$, such as value of temperature, voltage, etc.

Once again with reference to FIG. 4, it should be noted that the total time of transmission on the message-communication channel MC must not exceed the diagnostic-test interval DTI of the system in so far as the transmission must take place in a continuous way and with the same cycle time $T_{cyc}$ as that of the program P in the worst case.

Figure 5:
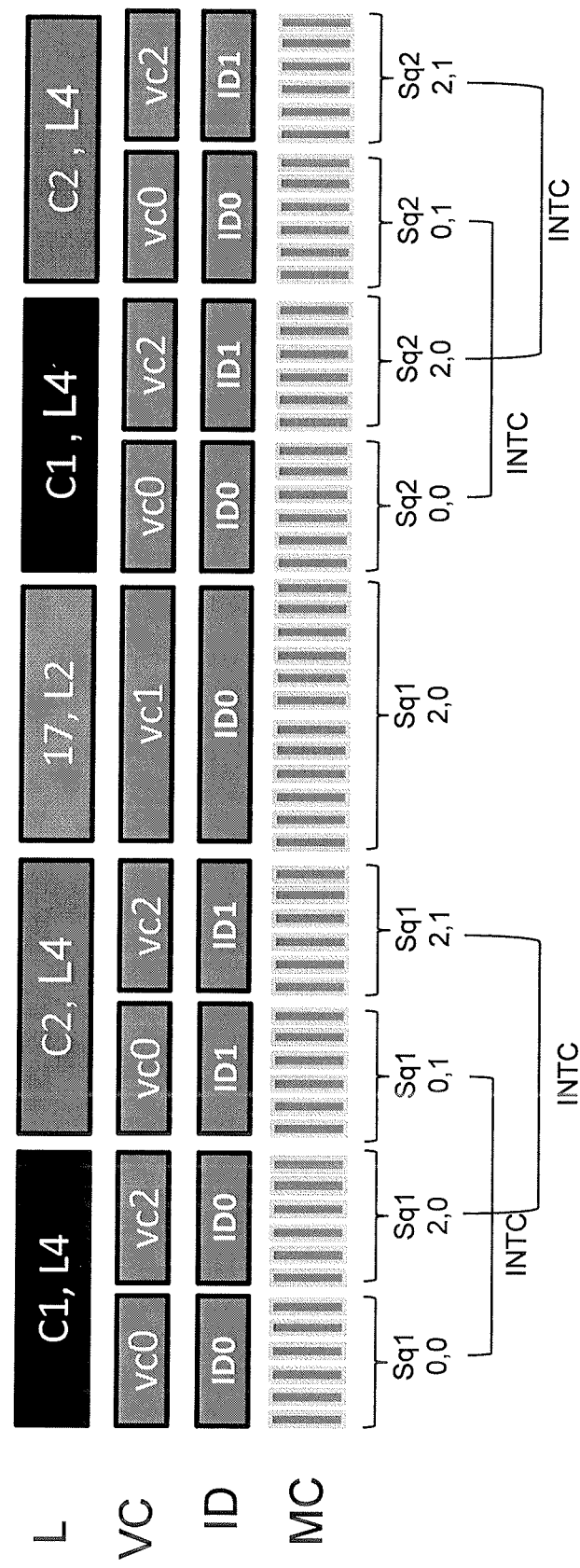

The checks made by the control module 15 on the sequences Sq of messages are described in the diagram of FIG. 5. Appearing in the first row is the hierarchical level, L, and the element concerned, whether processor module C1 or C2 or else supervisor module 17. The messages MC marked with the identifiers ID0 and ID1 are encapsulated in different sets of messages Sq (Sq1 and Sq2) and included within the different logic channels VC. They are subjected to two types of checks by the control module 15:

intra-channel checks ITC (not represented in FIG. 5), which are applied to messages that belong to one and the same logic channel VC and to one and the same identifier ID; and inter-channel checks INTC, which are applied to messages MC that belong to different logic channels VC (for instance, first message Sq1 0,0 of ID0 compared with first message Sq1 0,1 of ID1, second message Sq1 2,0 of ID0 compared with second message Sq1 2,1 of ID1, etc.); these inter-channel checks INTC are made in addition to, and at a higher level than, the intra-channel checks ITC that are aimed at verifying consistency of the messages coming from each of the channels.

It should be emphasized that FIG. 5 represents the messages according to their origin and not the temporal sequence with which they are transmitted.

The structure of the communication protocol PL described and of the checks that are carried out on the sets of the messages finds direct correspondence in the functional architecture of the control module 15 down to its implementational micro-architecture, as will be described with reference to FIG. 6.

As has been mentioned, implementations are possible for the control module 15 both of a software type and of a hardware type with dedicated logic, for example in an FPGA device or else in an ASIC.

FIG. 6 shows the main functions integrated in the control module 15.

Figure 9:
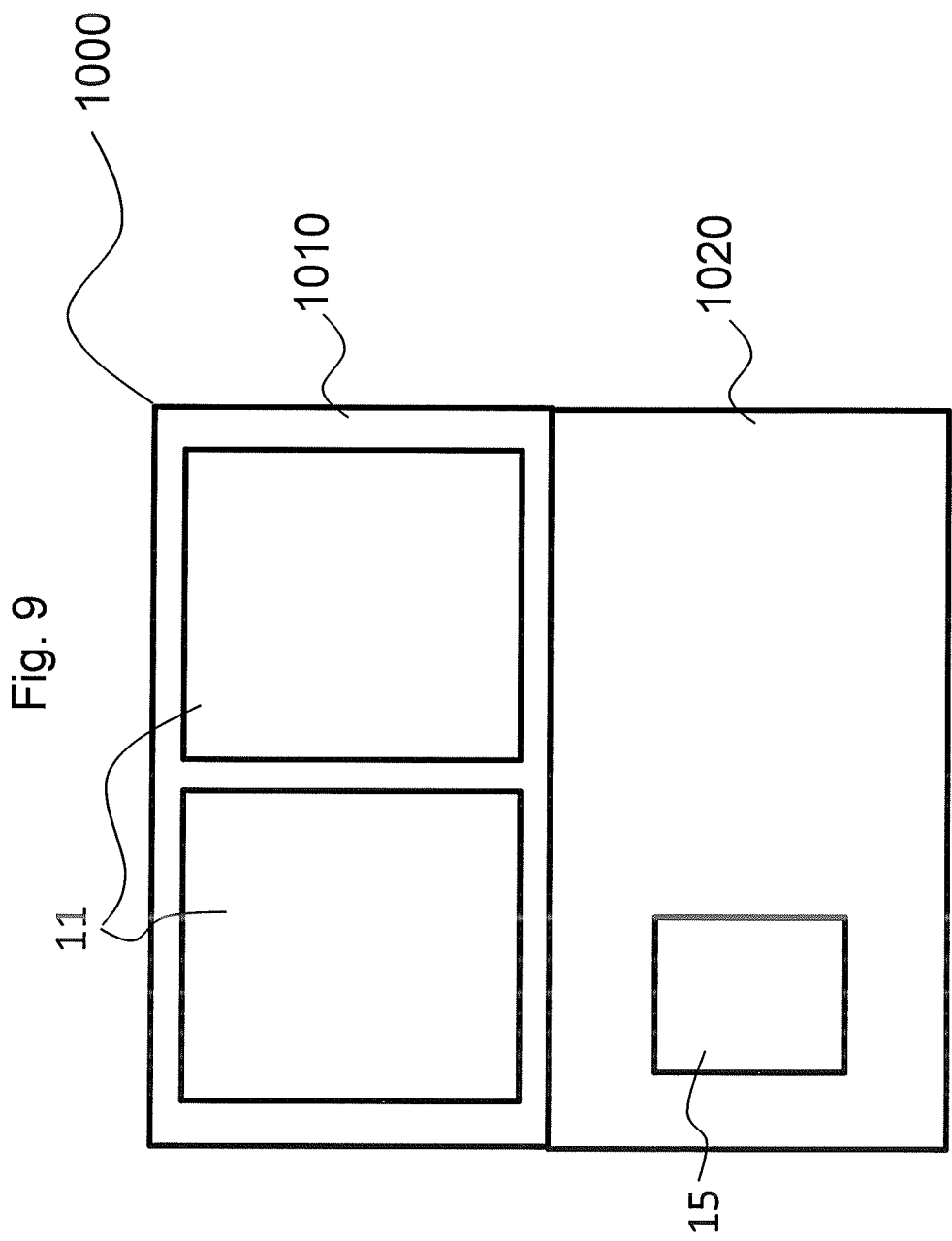
FIG. 9 shows a principle diagram of an implementation of the system on a SoC (System-on-Chip), with dual-core symmetrical multiprocessor.

The scheme of FIG. 6 represents dedicated hardware units, but may equally represent functional units used for providing, for example, an implementation as embedded software in a processor module separate from the multiprocessor 10 or else as dedicated hardware in an FPGA device or else in an ASIC. Purely by way of example, FIG. 9 shows a possible implementation of the architecture proposed on a System-on-Chip (SoC) 1000, in particular with two-core symmetrical multiprocessor, in which two processors 11 are contained in a "hard macro" 1010, whereas the control module 15 is a software module executed on a redundant processor implemented in a programmable portion 1020 (FPGA) of the SoC 1000.

To return to FIG. 6, designated by 112 is a bus interface towards the communication bus 12, which comprises a configuration-and-status interface module 112c, and buffers 112b for the messages of the different channels ID0 and ID1. It further comprises a module 112a for a CRC check on the packets arriving.

Designated by 113 is a timing module, for checking timing, in particular for checking that the execution time remains within the limits set for the check.

Designated by 114 is a module for the inter-channel checks (operations INTC), which comprises a comparator 114a for inter-channel comparison of the data of the channels and a hardware fault injector 114b.

Designated by 116 is a module for the intra-channel checks (operations ITC), which comprises modules 116a, 116b, 116c for checking the arrival time, the order, and the value of the data arriving.

The data are supplied to the aforesaid modules 114 and 116 by a message-dispatcher module 115, which preferably comprises a DMA (Direct Memory Access) module 116a and a message-controller module 116b.

Designated by 111 is an error controller, which, via a programmable event router sends alarms to the module 16. The information and the signals regarding the data and alarms that derive from anomalous conditions detected from the comparisons between the physical channels ID0 and ID1 or against the expected ranges of values or pre-calculated results, in the modules 114 and 116 are kept separate (from the logic, electrical, and physical standpoint) as required by the reference safety standards (see, for example, IEC 61508 "Safety design recommendations"). Once again with reference to FIG. 6 the alarms are indicated by a dashed line. The alarm sources indicated regard detection of anomalies in the following comparisons:

inter-channel checks INTC (module 114)—this type of comparison includes comparisons of values, for example values expected to be the same calculated by different cores of the multiprocessor, and comparisons with pre-calculated expected values; they generate an inter-channel alarm Aintc;

intra-channel checks ITC (module 116)—this type of comparison includes comparisons with pre-calculated expected values or else checking against a pre-defined reference range (for example, of operating temperature or voltage); they generate an intra-channel alarm Alitc;

checks on the timings (module 113), for example on whether the execution time remains within the extremes set for the check; they generate a timing alarm Alt; and anomalies in the structure and composition of the message from the formal standpoint; in the example considered, the failure of a check of a CRC type made by the CRC module 112a on the text of a message at input to the interface 112, this check generating an alarm ALc.

Finally, the control module 15 comprises a fault-injection module 117.

As may be understood from the description of FIG. 6, the logic modules 51 and 61 are not implemented separately, but the functions necessary for each of these logic modules are basically carried out by the modules 114, 116, and 113.

Figure 10:
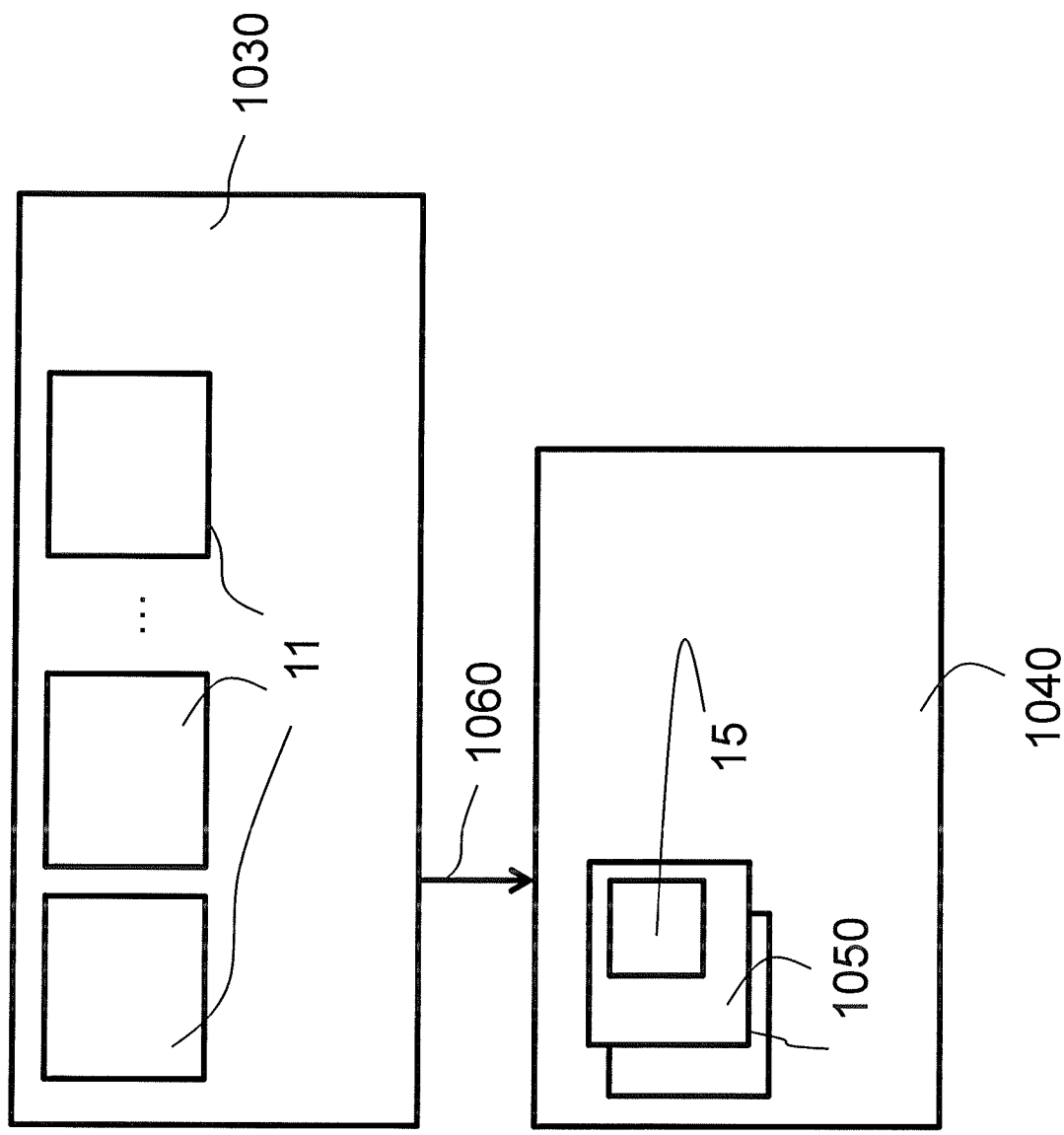
FIG. 10 shows a principle diagram of an implementation of the system on two components, a SoC and an external device.

Once again purely by way of example, FIG. 10 shows a possible implementation of the architecture proposed on a combination of two separate components, a SoC (System-on-Chip) 1030, in particular with symmetrical multiprocessor with four processor modules 11, whereas the control module 15 is a software module run on a redundant processor 1050 implemented in an ASIC or FPGA 1040 that interfaces with the SoC 1030 via PCI 1060.

As regards the calculation of the coverage target deriving from self-test operations $A_{chk}$, the applicational coverage target $k_{chk}$ in the case of comparison of the intermediate results, for example, is determined as a function of the amount of data q exchanged at each comparison with respect to the total amount and as data-exchange period t (the inverse of which is the data-exchange frequency f) with respect to a target time T—typically calculated as corresponding to the PST (Process Safety Time) or FTTI (Fault-Tolerant time Interval) defined by the functional-safety standards referred to above:

$$k_{chk}=\min(1,q \cdot T/t) \qquad (3)$$

The data-exchange period t corresponds to the safe-execution time Ts.

From Eqs. (1) and (2) we find that the coverages k1, k2, k12 depend upon the value of the comparison coverage $k_{chk}$, and that the failure-probability target is a function of k1, k2, k12. Consequently, we also find that, given a failure-probability target g, the values of the amount of data q exchanged and of the frequency f of exchange of the data are sized so that the comparison coverage $k_{chk}$ will assume a value such that, once it is entered into Eqs. (1) and (2), the failure-probability target g will be respected.

The method described herein is aimed, however, at applications for which it may be necessary to exploit all the computational power of the processors available. Consequently, the method according to the invention provides executing the diagnostic-self-test operations $A_{stl}$, which carry out diagnostic self-tests, and the operations $A_{sys}$ of self-testing of measured system values, according to what has been described so far. The above diagnostic-self-test operations $A_{stl}$ and operations $A_{sys}$ of self-testing of measured system values identify respective coverage targets $k_{stl}$ and $k_{sys}$, which, once entered, for example, into equations such as Eq. (2) determine the coverage of the programs P1, . . . , Pn. Given the contributions of the coverage targets $k_{stl}$ and $k_{sys}$, the remaining contribution $k_{chk}$, i.e., the coverage target guaranteed by the applicational self-testing, in order to respect the failure-probability target g, is obtained using applicational self-test operations $A_{chk}$ that are less burdensome from the standpoint of computational power.

According to a first embodiment, the above applicational self-test operations $A_{chk}$ that are less burdensome from the standpoint of computational power comprise operations $A_{cou}$ of checking periodic execution of the conditions of use. The advantage of operating with the conditions of use instead of with the intermediate programs is that typically (as illustrated in FIG. 11A) the applicational self-test operations $A_{chk}$ via comparison of intermediate programs supply an applicational coverage $k_{chk}$ that significantly overlaps that of $k_{stl}$ and hence entail a "waste" of computational resources. Instead, the coverage by the operations $A_{cou}$ of checking periodic execution of the conditions of use. is determined in order to limit the above overlapping (see, for example, FIG. 11B) and hence limit the waste of computational resources.

Hence, the applicational self-test operations $A_{chk}$ comprise self-test operations $A_{cou}$ of checking periodic execution of conditions of use, regarding the fact that the programs P1, P2, . . . , Pn (or a subset thereof) are required to respect given CoUs (Conditions of Use), such that, when they are respected at least once within the PST or FTTI defined by the functional-safety standards referred to above, they will guarantee a corresponding coverage target $k_{cou}$ that respects the following condition:

$$k_{stl} \cup k_{cou} = k_{chk} \cup k_{stl} \quad (4)$$

i.e., the condition whereby the union of the diagnostic self-test coverage $k_{stl}$ and to the coverage for conditions of use $k_{cou}$ is the same as the union of the coverages $k_{chk}$ and $k_{stl}$ given by the applicational self-test operation and by the diagnostic-self-test operation, respectively.

By way of example, the above CoUs can be grouped into in two classes:

"Class 1"—condition of use whereby the programs include a check on the program flow, this being a technique known in the art;

"Class 2"—condition of use whereby the programs include one or more of the known techniques given below:

check on consistency of the data, for example, by comparing data coming from different inputs of the processor;

encapsulation of the data with a code, for example, of a CRC type;

periodic execution of a test using fixed data patterns; and periodic repetition of portions of the subprograms.

Purely by way of example and to clarify further the meaning of the term "conditions of use", appearing hereinafter is a detailed description of a class-2 CoU (regarding encapsulation of the data with code):

"During each FTTI, the program must transfer between the processor and the memory at least one data packet containing at least four 64-bit data, such as to be stored at at least four consecutive memory addresses. The source address, the address of the addressee, and the overall number of bytes transferred must be multiples of 64 bytes. The datum must be encapsulated with a code (for example of a CRC type). The code is contained in the datum. When the packet is read, the program must regenerate the CRC and compare it with the one contained in the word read".

It should be noted how the description contains the words "at least" and "must be", which hence represent "conditions" that the programmer must respect. It should also be noted how the description contains the phrase "during each FTTI", thus indicating the periodicity.

Consequently, from the above detailed description of a class-2 CoU, for example the conditions CN1, CN2, CN3 are, amongst others, extracted:

CN1="transfer between the processor and the memory at least one packet data containing at least four 64-bit data"

CN2="packet [ . . . ] such as to be stored at at least four consecutive memory addresses"

CN3="the source address, the address of the addressee, and the overall number of bytes transferred must be multiples of 64 bytes", each of these conditions being associated to a condition of periodicity, i.e., execution during each FTTI.

In regard to the self-test operations of checking execution of conditions of use $A_{cou}$, the solution described herein provides also a technique for facilitating checking that these conditions of use are effectively contained in the programs P1, P2, . . . , Pn.

With reference also to FIG. 7, this technique consists in the fact that:

each program P1, P2, . . . , Pn, whenever it executes a CoU, notifies it (via a purposely provided variable) to the test interface 201;

the test interface 201 is configured via programming to know how many conditions of use must be satisfied at least once within the PST or FTTI defined by the functional-safety standards referred to above;

on the basis of the above information, the test interface 201 notifies whether the number of the conditions of use satisfied at least once within the PST or FTTI is equal to the programmed number, supplying this information as self-test datum $D_{chk}$, plus a self-test datum for the conditions of use $D_{cou}$.

Figure 14:
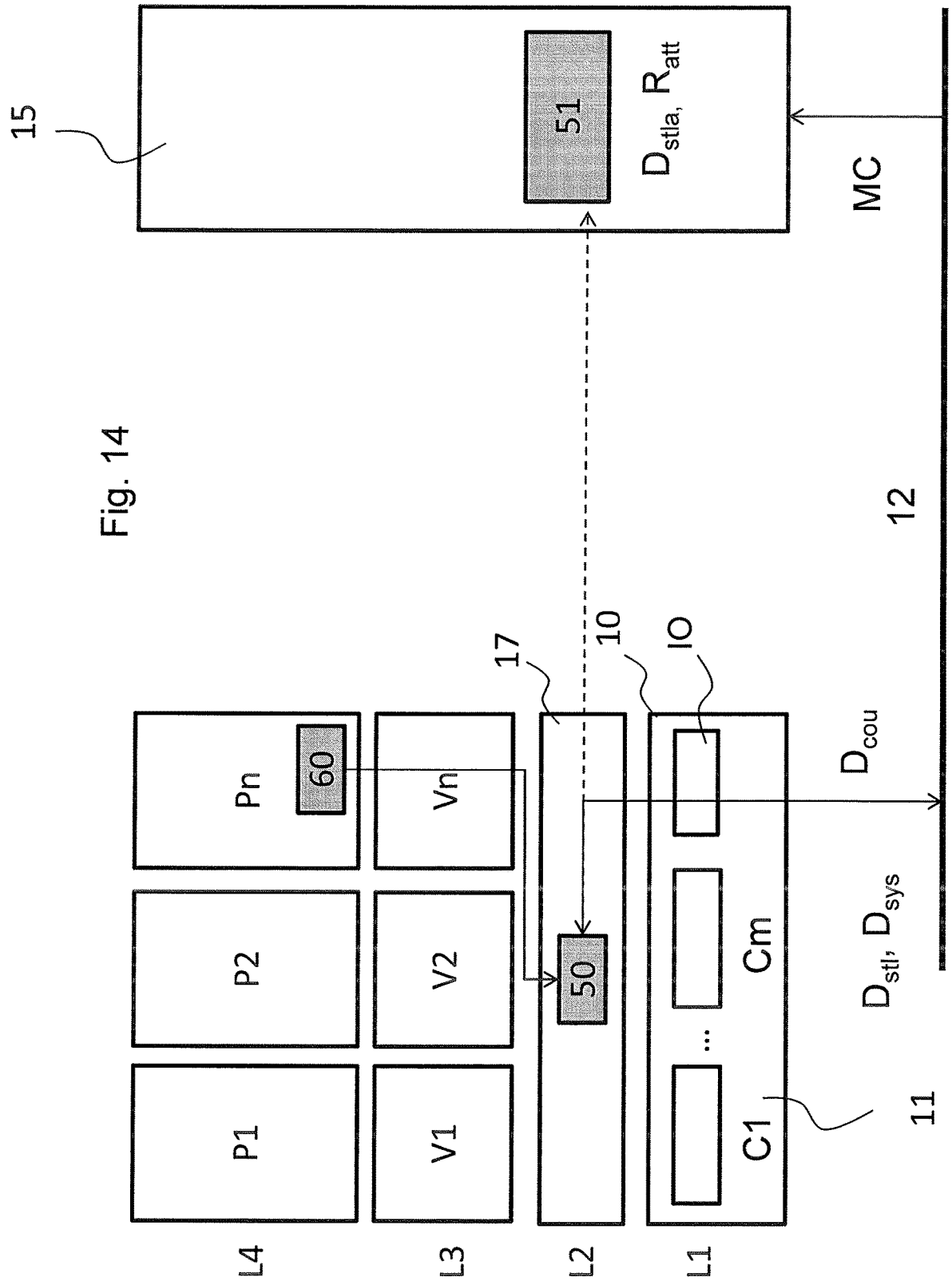
FIG. 14 shows a variant embodiment of the scheme of software layers of the multiprocessor architecture configured for implementing the method described herein.

FIG. 14 illustrates in this connection a possible simplified variant of the functional-safety architecture of FIG. 3, in which each subprogram P1, P2, . . . , Pn, whenever it executes a CoU, notifies it through the application-comparison software modules 60 to the diagnostic self-test libraries 50, which comprise the test interface 201. The test interface 201 then sends the corresponding self-test datum for the conditions of use $D_{cou}$ in the monitoring and control messages MC to the processing and comparison unit, i.e., the control module 15. In the embodiment of FIG. 4, for simplicity, it is provided to use just the self-test logic components 51 for checking also the self-test data for the conditions of use $D_{cou}$. The self-test operations $A_{cou}$ can in any case be implemented also via the complete architecture of FIG. 3.

According to a further embodiment, the above applicational self-test operations $A_{chk}$ that are less burdensome from the standpoint of computational power comprise operations of checking the periodic execution of LBISTs (Logic Built-In Self Tests) $A_{bst}$.

Also here, the coverage for the operations of a LBIST type $A_{bst}$ prevents overlapping due to the comparison of intermediate programs described with reference to FIG. 11B and hence limits the waste of computational resources.

Hence, the applicational self-test operations $A_{chk}$ comprise operations $A_{bst}$ for checking execution of LBISTs, regarding the fact that the hardware of the processor is required to turn on periodically so-called LBIST circuits, in themselves known to persons skilled in the sector, such that, when they are set in operation at least once within the PST or FTTI defined by the functional-safety standards referred to above, they will guarantee an LBIST coverage $k_{bst}$ such that:

$$k_{stl} \cup k_{bst} = k_{chk} \cup k_{stl} \quad (5)$$

i.e., a condition whereby the union of the diagnostic self-test coverage $k_{stl}$ and the LBIST coverage $k_{bst}$ is equal to the union of the coverages $k_{chk}$ and $k_{stl}$ given by the self-test operation $A_{chk}$ and by the diagnostic-self-test operation $A_{stl}$, respectively.

As regards the LBIST self-test operations $A_{bst}$ that generate corresponding self-test data $D_{bst}$ to be checked in the module 15, the solution described here provides that:

each program P1, P2, . . . , Pn, whenever it decides that it is the appropriate moment for it to be interrupted (for example, because the function that it performs is not used at that specific moment of the application), it notifies to the corresponding physical layer L1 that the LBIST operation can be started;

at this point, the corresponding hardware circuit that carries out the LBIST test, for example, the circuit 41 represented in FIG. 15 and described in what follows (typically, a machine of an LFSR or MISR type, in itself known to the person skilled in the sector), is activated and—after a certain time—generates the result of LBIST test $D_{bst}$ for the core in question;

this result (in the form, for example, of a "go/no-go" warning) is passed to the test interface 201;

on the basis of the above information, the test interface 201 notifies whether all the LBIST self-test operations $A_{bst}$ have been executed and with what outcome, supplying this information as self-test datum $D_{chk}$ in the message MC plus, possibly, a self-test datum for the conditions of use $D_{cou}$.

FIG. 15 shows, in this connection, a possible simplified variant of the functional-safety architecture of FIG. 3, in which each program P1, P2, . . . , Pn, whenever it deems that it can execute the LBIST operation, notifies it through the application-comparison software modules 60 at the layer L4 to the corresponding layer L1 in which an LBIST circuit 41 resides. Once the LBIST circuit 41 has completed its operation, it notifies it to the diagnostic self-test libraries 50, which comprise the test interface 201.

The test interface 201 then sends the corresponding self-test datum $D_{bst}$ in the monitoring and control messages MC to the processing and comparison unit, i.e., the control module 15. Here, it is provided, in the embodiment of FIG. 15, for simplicity, to use just the self-test logic components 51 for checking also the self-test data for the conditions of use $D_{bst}$. The LBIST self-test operations $A_{bst}$ can, in any case, be implemented also via the complete architecture of FIG. 3.

It is moreover emphasised that, to obtain a greater flexibility, in variant embodiments it is also possible to combine comparison self-test operations $A_{cou}$ and $A_{bst}$ so as to guarantee the following equation:

$$k_{stl} \cup k_{bst} \cup k_{cou} = k_{chk} \cup k_{stl} \qquad (6)$$

Figure 12:
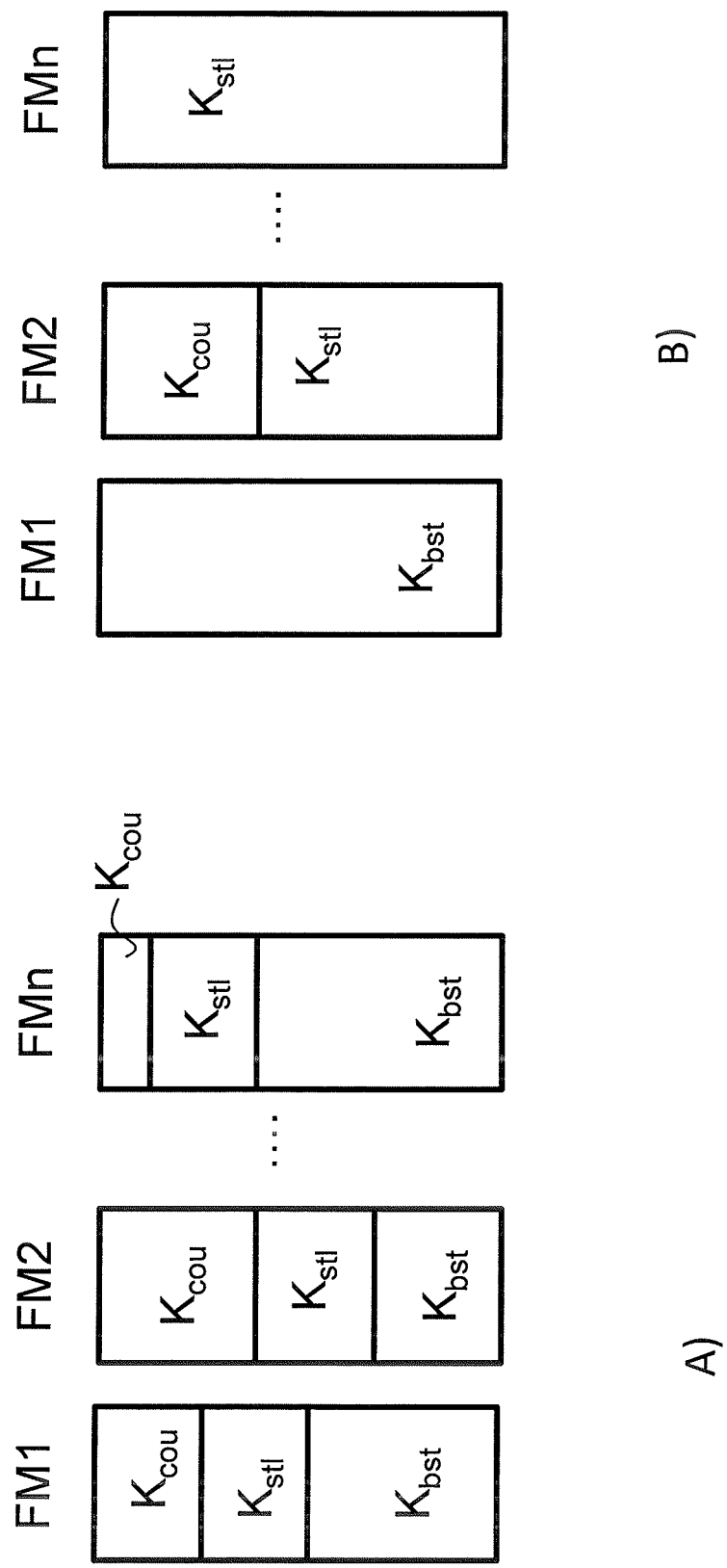
FIG. 12 shows a logic diagram of modes of combination between self-test operations.

Eq. (6) can be satisfied in two ways, as illustrated in FIG. 12:

given different failure modes FM1, FM2, . . . , FMn, by combining the three corresponding operations $A_{stl}$, $A_{cou}$, and $A_{bst}$ in a "joint" way (FIG. 12A); i.e., each failure mode FM1, FM2, . . . , FMn is covered by all three coverages guaranteed by each operation; by combining the three operations, $A_{stl}$, $A_{cou}$, and $A_{bst}$, in a "disjoint" way (FIG. 12B); i.e., each failure mode FM1, FM2, . . . , FMn is covered by one (or at the most two) of the three coverages guaranteed by each operation, for example, by $k_{stl} + k_{bst}$ and disjointly by $k_{cou}$, or else by $k_{stl} + k_{bst}$ and disjointly by $k_{cou}$.

The advantage of the disjoint mode is that, for example, the LBIST self-test operations $A_{bst}$ are more invasive (they require an increase of the area of silicon of the device and/or a long execution time according to the number of tests to be carried out), and hence it may be convenient to limit these operations just for some failure modes, and concentrating the diagnostic-self-test operations $A_{stl}$ and the operations regarding checking of the conditions of use $A_{cou}$ on other failure modes. In this way, the impact is reduced (the number of the tests that the LBIST circuits have to make is lower) and hence the cost for use of the LBIST self-test operations $A_{bst}$ is reduced.

Since also the self-test operations $A_{cou}$ of checking conditions of use may be invasive in regard to the programs (they require respect of some conditions of use that could be, for some programs, burdensome to fulfil and/or to verify), it may be convenient to limit these operations just for some failure modes and concentrate the diagnostic-self-test operations $A_{stl}$ and LBIST self-test operations $A_{bst}$ on other failure modes. In this way, the impact and hence the cost for use of the self-test operations of conditions of use $A_{cou}$ is reduced.

It should be noted that the introduction of the self-test operations for conditions of use $A_{cou}$ and LBISTs $A_{bst}$ also facilitates implementation of multi-processor solutions at a mixed-integrity level, i.e., solutions whereby the coverage requirement for each processor is different in relation to the program to be executed.

Figure 13:
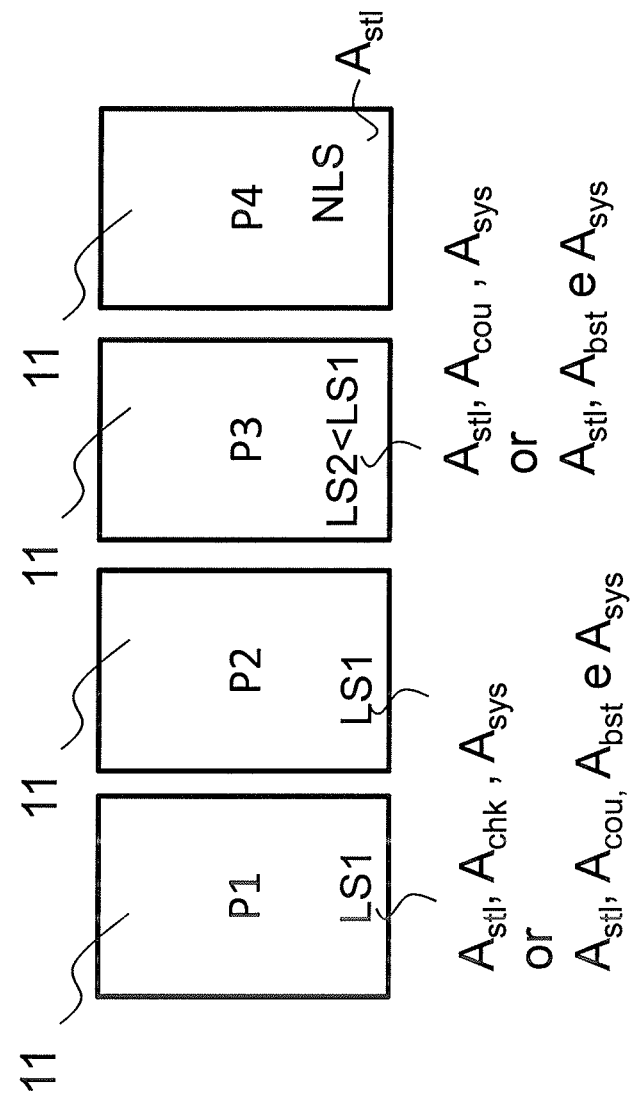
FIG. 13 shows a logic diagram of use of self-test operations in different configurations of use.

By way of example of this property of the solution described, as illustrated in FIG. 13, consider a multi-processor system like the one of FIG. 10, made up of four cores 11, two of which, the ones that execute the subprograms P1 and P2 have one and the same requirement of integrity level LS1, for example, SIL2 or ASILB defined by the functional-safety standards referred to above, while the core 11 that executes the program P3 has a lower mixed-integrity level LS2, for example, SIL1 or ASILA respectively, whereas the core 11 that executes the subprogram P4 is not aimed at programs critical for safety, and hence does not have an integrity-level requirement, this being designated by NLS in the figures. In this scenario, the solution described enables in a very flexible way:

use of a combination of diagnostic-self-test operations $A_{stl}$, of self-test operations $A_{chk}$ of checking of intermediate results, of measurement self-test operations $A_{sys}$, or else of a combination of diagnostic-self-test operations $A_{stl}$, measurement self-test operations $A_{sys}$, self-test operations of execution of conditions of use $A_{cou}$ or LBISTs $A_{bst}$ for the processors 11 that execute the subprograms P1 and P2 associated to a higher coverage value k deriving from the SIL or ASIL value LS1;

using a combination of diagnostic-self-test operations $A_{stl}$, $A_{cou}$, and $A_{sys}$ or $A_{stl}$, $A_{bst}$, and $A_{sys}$ for the processor 11 that executes the subprogram P3 at a lower coverage value k deriving from the SIL or ASIL value LS2;

using, for just the interference check (i.e., non-requested access of the subprogram P4 to the resources of the subprograms P1, P2, and P3), diagnostic-self-test operations $A_{stl}$ for the processor 11 that executes the subprogram P4.

Hence, more in general, it is provided that, given a plurality of processing modules 11 assigned to which is execution of respective parallel subprograms P1, . . . , Pn, when a subset of these subprograms, in this case P3, has an integrity level (LS2) lower than the integrity level (LS1) of another subset of the subprograms, a combination of the self-test operations is used that comprise the diagnostic-self-test operations $A_{stl}$, which carry out diagnostic self-tests, operations $A_{sys}$ of self-testing of measured system values, applicational self-test operations $A_{chk}$, which include checking execution of condition of use $A_{cou}$ or execution of LBISTs $A_{bst}$ for the subset of programs, i.e., P3, which has the lower integrity level LS2.

Hence, from the above description the advantages of the invention emerge clearly.

The method and architecture described advantageously make it possible to satisfy given requirements of functional safety for a multi-channel or single-channel system, even one that is highly integrated in a multiprocessor on a single integrated circuit.

The procedure described above of decomposition of the programs and partitioning of the self-test operations into three separate operations, namely, self-testing via diagnostic tests, self-testing via monitoring of the system values, and applicational self-test via combination of check on execution of conditions of use and/or LBISTs, as well as the corresponding Eq. (1), enables precise identification of the coverage targets to be assigned to each of the three self-test operations, likewise enabling distribution of the targets in an optimised way, i.e., lowering the targets for the operations that—for the particular type of system to which the method described is applied—would require a major design effort to be achieved, and, instead, raising the targets for the operations that in such a context are easier to carry out.

The solution described moreover enables mitigation of the problem of CCFs (Common-Cause Failures) through introduction of an element, basically represented by a control module, i.e., an independent electronic-timer module, periodically queried by the processor at pre-set time intervals for carrying out the three different self-test operations described with a given periodicity or frequency.

In particular, the above is obtained by carrying out in the self-test operations:
a checking function both of a temporal type and of a value and sequence type by: imposing checks on occurrence of pre-defined events within pre-defined time windows and respect of pre-defined sequences; and checking numeric values, determined or in any case calculated by the processors, that correspond to the aforesaid diagnostic-self-test operations;
detection of occurrence of CCFs in the processors by comparison of values calculated by the processors, or else measured via sensors available in the processors or in general in the multiprocessor, against pre-calculated correct values corresponding to the aforesaid operations of self-testing of the system values; and
implementation of protocols for determining the integrity of the processors based upon cross-checking, which correspond to the aforesaid operations of self-testing of the intermediate results of the programs.

In this regard, it is emphasized how highly integrated and homogeneous circuit implementations of the multiprocessors are the ones that guarantee the highest performance and the lowest cost of the system, but at the same time are liable to problems of CCF, which are all the more important and difficult to prevent and/or detect the more the architectures are homogeneous and highly integrated. The presence of CCFs is the main reason why this type of architectural and constructional solutions are not widely used in the world of applications subject to safety standards in the automotive and industrial fields, with consequent loss of the economic benefit that could be achieved.

The solution described moreover enables combination of the control software of virtual machines (for example, hypervisors) with dedicated software programs that implement the aforesaid self-test operations and that, by means of their joint use, enable the requirements for achieving the functional-safety integrity levels required in industrial and automotive applications to be met.

The solution described moreover enables (as illustrated with reference to Eqs. 5 and 6) dosing of the various self-test operations in order to obtain the maximum functional safety with the minimum cost in terms of performance or complexity of the hardware.

The method and architecture described moreover enable a logic and temporal monitoring, in particular optimised for multicore systems with support for cross-checking between cores;
implementation of diagnostics both for architectures with 1oo1 voting and for architectures with 1oo2 voting;
monitoring of information regarding the hardware of the multicore (status, temperature, state of supply, etc.);
self-monitoring system in accordance with the specification IEC 61508 2nd Ed. that can be integrated in SIL2 and SIL3 systems;
standard interface to be used with the software;
configurable reaction; and
possibility of optimisation for the technology of implementation chosen (FPGA or ASIC).

Of course, without prejudice to the principle of the invention, the details and the embodiments may vary, even considerably, with respect to what is described herein purely by way of example, without thereby departing from the sphere of protection, this sphere of protection being defined by the annexed claims.

In the safety architecture considered by way of example, the control module 15 may be associated to a voter module that is commonly used in multichannel architectures for comparing continuously the outputs of the channels before these are used by the program or by the actuators, evaluating, according to the voting techniques, the safe output to be supplied to the program. An OR gate can receive the output of the control module 15 and the output of the voter and detect possible differences between these outputs. Detection of a difference determines a condition of detection of failure that forces the system to reach or maintain a safe state as defined for the program that is being executed.

The term "library" has been used in the present description for defining the software modules of diagnostic self-test programs, but may also be applied to the modules for self-testing of the system data (which, as has been said, may be comprised in the diagnostic self-test library) and to the self-test modules for comparison between intermediate results of the subprograms.

The aforesaid libraries or software modules comprising the self-test programs may, for example, be stored in a flash memory, available on the card or integrated circuit that comprises the processing system, and then loaded into a RAM of the processing modules.

Even though the method described herein refers to a processing system, in particular a multiprocessor system, and control module, the operations of decomposition into subprograms in themselves also apply to the processing system alone, without any independent control module. In other words, forming the subject of the present disclosure is also a method for executing programs in an electronic system for applications with functional safety including a processing system of the single-processor or multiprocessor type, the method comprising: performing an operation of decomposition of a program that includes a safety function and is to be executed via said system into a plurality of parallel subprograms; assigning execution of each parallel subprogram to a respective processing module of the system, in particular a processor of said multiprocessor architecture or a virtual machine associated to one of said processors; carrying out in the system, periodically according to a program cycle frequency during normal operation of the system, in the framework of said safety function, self-test operations associated to each of said subprograms and to the corresponding processing modules on which they are executed, wherein the above self-test operations comprise diagnostic-self-test operations, which carry out diagnostic self-tests, operations of self-testing of measured system values, self-test operations of comparison via appropriate combination of checking execution of conditions of use and/or of LBISTs, and said self-test operations comprise generating respective self-test data corresponding to the self-test operations and carrying out operations of check on said self-test data, execution of said operation of decomposition of the program into a plurality of parallel subprograms obtaining a coverage target for each of said self-test operations that is associated to a respective subprogram or processing module, in such a way that it respects a given failure-probability target.

It is to be noted that the term "condition of use" indicates the fact that the so-called dedicated operations must be written in the main program by the programmer, in quantities and with characteristics sufficient to reach the coverage targets (as will be seen hereinafter). Hence, the aforesaid operations represent for the programmer a necessary "condition" for use of the electronic system in the context of functional safety.

What is claimed is:

1. A method for executing programs in an electronic system for applications with functional safety that comprises a single-processor or multiprocessor processing system (10) and a further independent control module (15), including:
    carrying out a decomposition of a program (P) that includes a safety function (SF) to be executed via said system (10) into a plurality of parallel subprograms (P1, ..., Pn);
    assigning execution of the parallel subprograms (P1, ..., Pn) to respective processing modules (11) of the system, which include processors (C1, ..., Cm) of said system (10) or virtual machines (V1, ..., Vn) correspondingly associated with said processors (C1, ..., Cm);
    carrying out in the system (10), periodically according to a cycle frequency ($f_{cyc}$) of the program (P) during normal operation of said system (10), in the context of said safety function (SF), self-test operations ($A_{st1}$, $A_{sys}$, $A_{chk}$) corresponding to said subprograms (P1, ..., Pn) correspondingly executed by the processing modules (11),
    said method being characterized in that said self-test operations ($A_{st1}$, $A_{sys}$, $A_{chk}$) include:
    diagnostic-self-test operations ($A_{st1}$), which carry out diagnostic self-tests;
    operations ($A_{sys}$) of self-testing of measured system values;
    applicational self-test operations ($A_{chk}$), which include operations of checking execution of conditions of use ($A_{cou}$) and/or execution of LBISTs (Logic Built-in Self-Tests) ($A_{bst}$), and
    said self-test operations ($A_{st1}$, $A_{sys}$, $A_{chk}$) include:
    generating respective self-test data ($D_{st1}$, $D_{sys}$, $D_{chk}$) corresponding to the self-test operations ($A_{st1}$, $A_{sys}$, $A_{chk}$) and carrying out checking operations (51, 61) on said self-test data ($D_{st1}$, $D_{sys}$, $D_{chk}$);
    exchanging said self-test data ($D_{st1}$, $D_{sys}$, $D_{chk}$) continuously via a protocol (PL) of messages (MC) with the further independent control module (15);
    carrying out at least part of said checking operations (51, 61) in said further independent control module (15); and
    executing said operation of decomposition of the program (P) into a plurality of parallel subprograms to achieve a coverage target ($k_{st1}$, $k_{sys}$, $k_{chk}$) for each of said self-test operations ($A_{st1}$, $A_{sys}$, $A_{chk}$) that is associated to a respective subprogram (P1, ..., Pn) or a processing module (11) in such a way that it respects a given failure-probability target (g12; g).

2. The method according to claim 1, characterized in that said given failure-probability target (g12; g) is a function of a coverage value ($k_{st1}$) determined by said diagnostic-self-test operations ($A_{st1}$), of a coverage value ($k_{sys}$) determined by the operations ($A_{sys}$) of self-testing of system values measured on the processing system (10), and of a coverage value ($k_{chk}$) determined by the applicational self-test operations ($A_{chk}$) which include operations of checking execution of conditions of use ($A_{cou}$) and/or execution of LBISTs ($A_{bst}$).

3. The method according to claim 1, characterized in that a calculation of said failure-probability target (g12; g) includes:
    considering said subprograms (P1, ..., Pn) as corresponding inputs of an AND logic function (AG) having as many inputs as are the subprograms (P1, ..., Pn);
    breaking down said AND logic function (AG) into two-input AND logic functions that have as inputs pairs of said subprograms (P1, ..., Pn), and calculating a product of failure probabilities at output from each two-input AND logic function, multiplied by a complement of a common-cause-failure fraction ($\beta$), and of an exposure time (texp); and
    calculating a probability target (g) as a function of a result of a preceding operation added to a value obtained by applying OR functions to common-cause failures between the pairs of sub-programs (P1, ..., Pn), which is multiplied by the common-cause-failure fraction ($\beta$).

4. The method according to claim 1, characterized in that said failure probabilities of the subprograms (P1, Pn) are respectively evaluated as a function of a union between coverage values ($k_{st1}$) determined by said diagnostic-self-test operations ($A_{st1}$) for the corresponding subprograms (P1, Pn), coverage values ($k_{sys}$) determined by the operations ($A_{sys}$) of self-testing of system values measured on the system (10), and coverage values ($k_{chk}$) determined by the applicational self-test operations ($A_{chk}$), which include operations of checking execution of conditions of use (Acou) or execution of LBISTs ($A_{bst}$).

5. The method according to claim 1, characterized in that said system (10) implements a virtual-machine-management module (17), which generates virtual machines (V1, ..., Vn) on which said subprograms (P1, ..., Pn) are to be correspondingly executed.

6. The method according to claim 1, characterized in that said carrying out at least part of said checking operations (51, 61) in said further independent control module (15), includes:
    making comparisons of diagnostic self-test data ($D_{st1}$) corresponding to intermediate results of calculations made on the processors (C1, Cm) of the system (10) according to the diagnostic-self-test operations ($A_{st1}$) with a set of stored pre-calculated and expected values ($D_{st1a}$);
    making the comparison of application self-test data ($D_{chk}$) produced by applicational self-test operations ($A_{chk}$) which include operations of checking execution of conditions of use ($A_{cou}$) and/or execution of LBISTs ($A_{bst}$); and
    comparing system self-test data ($D_{sys}$) with stored expected ranges ($R_{att}$).

7. The method according to claim 1, characterized in that said further independent control module (15), is configured for carrying out, on the self-test data ($D_{st1}$, $D_{sys}$, $D_{chk}$):
    a check on the measured system values for verifying that the application self-test data ($D_{chk}$) or the diagnostic self-test data ($D_{st1}$) are the same or correct;
    a check on ranges of values for verifying that a value of a system self-test datum ($D_{sys}$) belongs to a pre-defined range of values ($R_{att}$);

a check on the order for verifying that an order of the messages is correct; and
a check on arrival times of the messages.

8. The method according to claim 1, characterized in that said operation of exchanging said self-test data ($D_{st1}$, $D_{sys}$, $D_{chk}$) continuously via the protocol (PL) of the messages (MC) with the further independent control module (15) includes organizing the messages (MC) in logic channels (VC) according to a hierarchical level (L) corresponding to said messages (MC) and according to a physical channel (ID0, ID1) corresponding to said messages (MC).

9. The method according to claim 8, characterized in that said operation of carrying out at least part of said checking operations (51, 61) in said further independent control module (15) includes execution of operations of:
intra-channel check (ITC) applied to messages that belong to one and the same logic channel (VC) and to one and the same physical channel (ID); and
inter-channel check (INTC) applied to messages that belong to different logic channels (VC).

10. The method according to claim 1, characterized in that, given the respective processing modules (11) have the respective parallel subprograms (P1, ..., Pn) assigned for execution, a subset of said subprograms (P1, ..., Pn) having an integrity level (LS2) lower than an integrity level (LS1) of another subset of said subprograms (P1, ..., Pn):
using a combination of said self-test operations ($A_{st1}$, $A_{sys}$, $A_{chk}$), which include said diagnostic-self-test operations ($A_{st1}$), which carry out diagnostic self-tests, said operations ($A_{sys}$) of self-testing of measured system values, and said applicational self-test operations ($A_{chk}$), which include operations of checking execution of conditions of use ($A_{cou}$) and/or execution of LBISTs ($A_{bst}$), for said subset of said subprograms (P3) having a lower integrity level (LS2).

11. The method according to claim 1, characterized in that, given different failure modes (FM1, FM2, ..., FMn):
using for each failure mode a combination that comprises operations belonging to the diagnostic-self-test operations ($A_{st1}$), which carry out diagnostic self-tests, and operations belonging to the applicational self-test operations ($A_{chk}$), which include operations of checking execution of conditions of use ($A_{cou}$) and/or execution of LBISTs ($A_{bst}$); or
using for each failure mode (FM1, FM2, ..., FMn) a combination that lacks at least one of: operations belonging to the diagnostic-self-test operations ($A_{st1}$), which carry out diagnostic self-tests, and operations belonging to the applicational self-test operations ($A_{chk}$), which include operations of checking execution of conditions of use ($A_{cou}$) and/or execution of LBISTs ($A_{bst}$).

12. The method according to claim 1, characterized in that said applicational self-test operations ($A_{chk}$) are operations of checking execution of conditions of use ($A_{cou}$).

13. The method according to claim 1, characterized in that said applicational self-test operations ($A_{chk}$) are operations of checking execution of LBISTs ($A_{bst}$).

14. A method for executing programs in an electronic system for applications with functional safety that comprises a single-processor or multiprocessor processing system (10), including:
carrying out a decomposition of a program (P) that includes a safety function (SF) to be executed via said system (10) into a plurality of parallel subprograms (P1, ..., Pn);
assigning execution of parallel subprograms (P1, ..., Pn) to corresponding processing modules (11) of the system, which include processors (C1, ..., Cm) of said system (10) or virtual machines (V1, ..., Vn) corresponding to said processors (C1, ..., Cm);
carrying out in the system (10), periodically according to a cycle frequency ($f_{cyc}$) of the program (P) during normal operation of said system (10), in the context of said safety function (SF), self-test operations ($A_{st1}$, $A_{sys}$, $A_{chk}$) corresponding to said subprograms (P1, ..., Pn) and correspondingly executed by processing modules (11),
said method being characterized in that said self-test operations ($A_{st1}$, $A_{sys}$, $A_{chk}$) include:
diagnostic-self-test operations ($A_{st1}$), which carry out diagnostic self-tests;
operations ($A_{sys}$) of self-testing of measured system values; and
applicational self-test operations ($A_{chk}$), which include operations of checking execution of conditions of use ($A_{cou}$) and/or execution of LBISTs (Logic Built-in Self-Tests) ($A_{bst}$), and
said self-test operations ($A_{st1}$, $A_{sys}$, $A_{chk}$) include:
generating respective self-test data ($D_{st1}$, $D_{sys}$, $D_{chk}$) corresponding to the self-test operations ($A_{st1}$, $A_{sys}$, $A_{chk}$) and carrying out checking operations (51, 61) on said self-test data ($D_{st1}$, $D_{sys}$, $D_{chk}$); and
executing said operation of decomposition of the program (P) into a plurality of parallel subprograms to achieve a coverage target for each of said self-test operations ($A_{st1}$, $A_{sys}$, $A_{chk}$) associated to a respective subprogram (P1, ..., Pn) or processing module (11) in such a way that it respects a given failure-probability target (g12; g).

15. An electronic system with functional safety including a single-processor or multiprocessor processing system (10) and a further independent control module (15), configured for executing the steps of the method according to claim 1.

16. At least one non-transitory computer-readable media having instructions that are loaded into a memory of a computer system, and are executed by at least one computer processor of the computer system, to cause the computer system to implement the method according to claim 1, in response to execution of the instructions by the at least one computer processor.

* * * * *